(12) United States Patent
Kobayashi et al.

(10) Patent No.: US 11,090,610 B2
(45) Date of Patent: Aug. 17, 2021

(54) HOLLOW FIBER MEMBRANE MODULE

(71) Applicant: TORAY INDUSTRIES, INC., Tokyo (JP)

(72) Inventors: Atsushi Kobayashi, Shiga (JP); Naoki Nakashima, Shiga (JP); Kenji Hayashida, Shiga (JP); Masayuki Hanakawa, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 41 days.

(21) Appl. No.: 16/482,089

(22) PCT Filed: Jan. 31, 2018

(86) PCT No.: PCT/JP2018/003150
§ 371 (c)(1),
(2) Date: Jul. 30, 2019

(87) PCT Pub. No.: WO2018/143250
PCT Pub. Date: Aug. 9, 2018

(65) Prior Publication Data
US 2020/0246754 A1    Aug. 6, 2020

(30) Foreign Application Priority Data
Jan. 31, 2017   (JP) .............................. JP2017-015171

(51) Int. Cl.
*B01D 63/04*   (2006.01)
*B01D 65/02*   (2006.01)

(52) U.S. Cl.
CPC .......... *B01D 63/043* (2013.01); *B01D 65/02* (2013.01); *B01D 2313/08* (2013.01); *B01D 2321/04* (2013.01)

(58) Field of Classification Search
CPC .... B01D 63/043; B01D 63/024; B01D 65/02; B01D 2313/08; B01D 2321/04; B01D 2321/02; B01D 2321/2008
See application file for complete search history.

(56) References Cited

U.S. PATENT DOCUMENTS

| 4,666,469 A | * | 5/1987 | Krueger | ................. | B01D 63/02 |
| | | | | | 95/54 |
| 5,143,612 A | * | 9/1992 | Hamanaka | ............. | B01D 63/02 |
| | | | | | 210/321.8 |

(Continued)

FOREIGN PATENT DOCUMENTS

| CN | 1157580 A | 8/1997 |
| CN | 202343103 U | 7/2012 |

(Continued)

OTHER PUBLICATIONS

International Search Report, issued in PCT/JP2018/003150, PCT/ISA/210, dated Mar. 6, 2018.

(Continued)

*Primary Examiner* — Liam Royce
(74) *Attorney, Agent, or Firm* — Birch, Stewart, Kolasch & Birch, LLP

(57) ABSTRACT

The present invention relates to a hollow fiber membrane module provided with: a tubular casing having a first end and a second end in the axial direction; a plurality of hollow fiber membranes; a first potting part; and a second potting part, the hollow fiber membrane module further having a flow regulation structure in which a fluid flowing outside the hollow fiber membranes from the second end side toward the first end side forms a flow directed to the radial center on the second end side of the first potting part, and further forms a radial flow directed from the radial center to the radially outer peripheral side on the second end side of the first potting part.

5 Claims, 18 Drawing Sheets

(56) References Cited

U.S. PATENT DOCUMENTS

| | | | |
|---|---|---|---|
| 5,470,469 A | 11/1995 | Eckman | |
| 2009/0050555 A1* | 2/2009 | Baba | B01D 65/02 210/321.69 |
| 2015/0034546 A1 | 2/2015 | Inuzuka et al. | |
| 2016/0107125 A1 | 4/2016 | Kobayashi et al. | |
| 2016/0317972 A1 | 11/2016 | Matsumoto et al. | |
| 2017/0291145 A1 | 10/2017 | Shimura et al. | |
| 2019/0262774 A1 | 8/2019 | Matsumoto et al. | |

FOREIGN PATENT DOCUMENTS

| | | |
|---|---|---|
| CN | 104307371 A | 1/2015 |
| CN | 105142764 A | 12/2015 |
| CN | 105828917 A | 8/2016 |
| EP | 3088069 A1 | 11/2016 |
| JP | 3-26327 U | 3/1991 |
| JP | 5-161831 A | 6/1993 |
| JP | 11-342320 A | 12/1999 |
| JP | 2010-5615 A | 1/2010 |
| WO | WO 2013/136903 A1 | 9/2013 |
| WO | WO 2015/098266 A1 | 7/2015 |
| WO | WO 2016/035798 A1 | 3/2016 |

OTHER PUBLICATIONS

Written Opinion of the International Searching Authority, issued in PCT/JP2018/003150, PCT/ISA/237, dated Mar. 6, 2018.

Extended European Search Report, dated Feb. 7, 2020, for European Application No. 18748262.5.

Chinese Office Action for Chinese Application No. 201830009543.6, dated Mar. 31, 2021, including an English translation of the Office Action.

* cited by examiner

HOLLOW FIBER MEMBRANE MODULE

TECHNICAL FIELD

The present invention relates to a hollow-fiber membrane module.

BACKGROUND ART

In recent years, a separation membrane such as microfiltration membrane or ultrafiltration membrane is utilized for a process in various areas including water treatment fields such as water purification treatment, water production and wastewater treatment, food industry and medical fields, because it has features of energy saving and space saving and has characteristics of providing power saving, product quality enhancement, etc.

On the other hand, when membrane separation is applied to a raw liquid, a membrane-impermeable substance such as suspended substances (hereinafter sometimes referred to as "suspended solids") and organic matters contained in the raw liquid gradually sticks and deposits on the membrane surface or in a membrane pore to cause clogging of the separation membrane. Thus, the power required for membrane separation increases as the liquid flow resistance of the separation membrane is increased, and it eventually becomes impossible to perform membrane separation. In the case where the membrane separation cannot be performed, in order to restore the membrane separation performance, chemical cleaning of a separation membrane is generally conducted, but when the clogging of the separation membrane progresses quickly, the frequency of chemical cleaning increases and the processing cost increases.

Accordingly, with an attempt to continuously maintain the membrane separation performance over a long period of time while eliminating clogging of the separation membrane, various membrane separation operating techniques have been developed. Examples thereof include backwashing of passing permeated liquid, water, etc. from the permeation side to the raw liquid side of the separation membrane to push out a substance stuck in a membrane pore or on the membrane surface; and air scrubbing of feeding a gas from the lower part of a hollow-fiber membrane module and physically cleaning the hollow-fiber membrane (i.e., a separation membrane in hollow-fiber form) by shaking the membrane (see, for example, Patent Document 1). Other examples include a flushing method of flowing raw liquid or a chemical solution at a high linear velocity parallel to a membrane surface on the raw liquid side of a hollow-fiber membrane (see, for example, Patent Document 2).

BACKGROUND ART DOCUMENTS

Patent Documents

Patent Document 1: JP-A-H11-342320
Patent Document 2: JP-A-2010-005615

SUMMARY OF THE INVENTION

Problems that the Invention is to Solve

However, in the case of filtering a raw liquid having a high turbidity, there have been cases where the flow channel in the hollow-fiber membrane module is blocked due to the accumulation of suspended solids, and the transmembrane pressure rapidly increases and the operation cannot be continued. Flushing is effective as a cleaning method for the hollow-fiber membrane module, but when the flow is not even during the flushing and a portion with a low flow rate is present, the separation membrane is not sufficiently cleaned and the suspended solids accumulate.

An object of the present invention is to provide a hollow-fiber membrane module which can improve the membrane cleaning effect by preventing drift during flushing, and can perform stable filtration for a long period of time even for a raw liquid having a high turbidity.

In order to attain the object described above, the present invention provides following [1] to [10].

[1] A hollow-fiber membrane module including: a cylindrical case having a first end and a second end in an axial direction; a plurality of hollow-fiber membranes housed in the case; a first potting part bonding end parts of the plurality of hollow-fiber membranes located on the first end side of the case while the end parts being open; and a second potting part bonding end parts of the plurality of hollow-fiber membranes located on the second end side of the case, in which the hollow-fiber membrane module further has a flow-regulating structure in which a fluid flowing outside the hollow-fiber membranes from the second end side to the first end side generates a flow directed to a radial center part on the second end side of the first potting part, and further generates a radial flow directed from a radial center part to a radially outer peripheral side on the second end side of the first potting part.

[2] The hollow-fiber membrane module according to [1], in which the flow-regulating structure includes an inner pipe and a flow-regulating cylinder which are provided on the second end side of the first potting part, the inner pipe is provided on a radial center part of the case, the inner pipe includes one or more side opening parts on a side surface thereof in the vicinity of the second end side of the first potting part, a filling ratio of the hollow-fiber membranes inside of the inner pipe is smaller than a filling ratio of the hollow-fiber membranes outside of the inner pipe, the flow-regulating cylinder is provided between the hollow-fiber membranes and the case, the flow-regulating cylinder has one or more flow-regulating holes on a side surface thereof, and the case has a side nozzle on a side surface thereof.

[3] The hollow-fiber membrane module according to [1], in which the flow-regulating structure includes a central space part and a flow-regulating cylinder which are provided on the second end side of the first potting part, the central space part is provided on a radial center part of the case, a filling ratio of the hollow-fiber membranes in the central space part is smaller than a filling ratio of the hollow-fiber membranes outside of the central space part, the flow-regulating cylinder is provided between the hollow-fiber membranes and the case, the flow-regulating cylinder has one or more flow-regulating holes on a side surface thereof, and the case has a side nozzle on a side surface thereof.

[4] The hollow-fiber membrane module according to [2], in which defining an inside diameter of the side nozzle as D and a length from the second end side of the first potting part to the second end of the case as L, a length of the inner pipe is from D to L.

[5] The hollow-fiber membrane module according to [3], in which defining an inside diameter of the side nozzle as D and a length from the second end side of the first potting part to the second end side of the second potting part as M, a length of the central space part is from D to M.

[6] The hollow-fiber membrane module according to [2] or [4], in which defining the filling ratio of the hollow-fiber membranes on inside of the inner pipe as A1, the filling ratio of the hollow-fiber membranes outside of the inner pipe as A2, a cross-sectional area of a cross section perpendicular to an axial direction of the inner pipe as T1, and a cross-sectional area of the cross section perpendicular to the axial direction of the case as T2, a flow parameter F in the following formula (1) is from 1.0 to 8.0.

$$F=(A2-A1)\times T1/T2 \tag{1}$$

[7] The hollow-fiber membrane module according to [3] or [5], in which defining the filling ratio of the hollow-fiber membranes in the central space part as A1, the filling ratio of the hollow-fiber membranes outside of the central space part as A2, a cross-sectional area of a cross section perpendicular to an axial direction of the central space part as T1, and a cross-sectional area of the cross section perpendicular to the axial direction of the case as T2, a flow parameter F in the following formula (1) is from 1.0 to 8.0.

$$F=(A2-A1)\times T1/T2 \tag{1}$$

[8] The hollow-fiber membrane module according to any one of [2], [4] and [6], in which the inner pipe has one or more side opening parts on the side surface thereof, defining the inside diameter of the side nozzle as D, the inner pipe has one or more first side opening parts on the side surface thereof in a range of the length D from the second end side of the first potting part, and a proportion R1 of a total opening area occupied by the first side opening parts to a total opening area of the side opening parts is 50% or more.

[9] The hollow-fiber membrane module according to [8], in which a proportion R2 of the total opening area of the first side opening parts of the inner pipe to the cross-sectional area of the cross section perpendicular to the axial direction of the case is from 5% to 50%.

[10] The hollow-fiber membrane module according to any one of [2] to [9], in which a proportion R3 of a total opening area of the flow-regulating holes of the flow-regulating cylinder to the cross-sectional area of the cross section perpendicular to the axial direction of the case is from 5% to 50%.

[11] The hollow-fiber membrane module according to any one of [2] to [10], in which defining the inside diameter of the side nozzle as D, the flow-regulating cylinder has one or more first flow-regulating holes on the side surface thereof in a range of the length D from the second end side of the first potting part, and a proportion R4 of a total opening area occupied by the first flow-regulating holes to the total opening area of the flow-regulating holes is 50% or more.

Advantage of the Invention

The hollow-fiber membrane module according to the present invention can prevent drift during flushing by using a flow-regulating structure, improve and uniform the flow rate, and improve the membrane cleaning effect and drainage for the suspended solids. Therefore, the accumulation of the suspended solids in the hollow-fiber membrane module is prevented, and stable filtration for a long period of time can be performed even for a raw liquid having a high turbidity.

BRIEF DESCRIPTION OF THE STRETCHINGS

MODE FOR CARRYING OUT THE INVENTION

The hollow-fiber membrane module of the present invention is described in more detail below with reference to the drawings.

In the present description, "vertical" refers to a direction along the axial direction of the hollow-fiber membrane module, and "horizontal" refers a direction perpendicular to the axial direction of the hollow-fiber membrane module.

Examples of the hollow-fiber membrane module according to the present invention include a first embodiment or a second embodiment described below. The present invention is not limited by the embodiments described below.

First Embodiment

<Hollow-Fiber Membrane Module>

Figure 1:
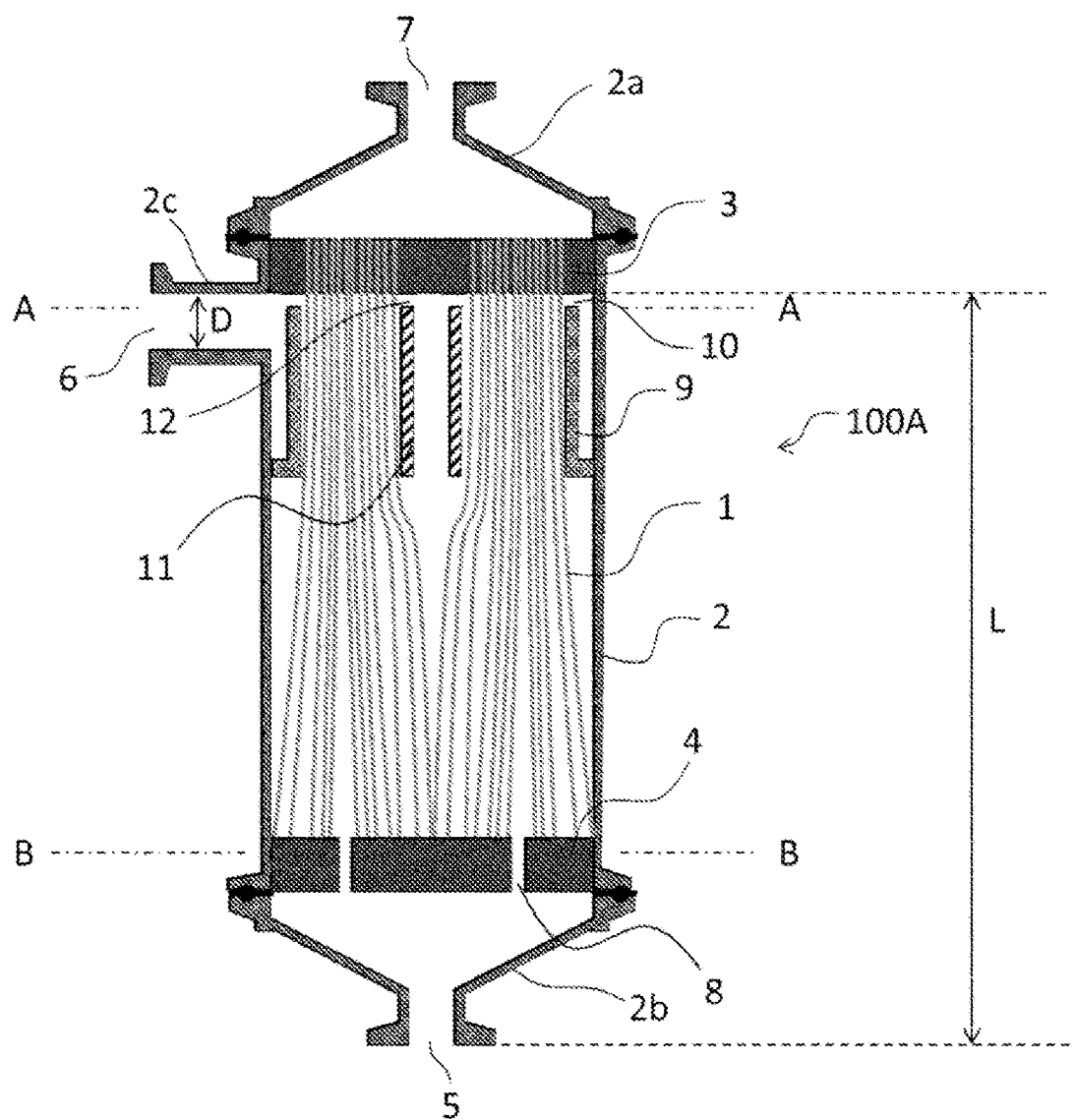
FIG. 1 is a schematic vertical cross-sectional view of a hollow-fiber membrane module according to the first embodiment of the present invention.

The configuration of the hollow-fiber membrane module according to the first embodiment of the present invention is described with reference to the drawings. FIG. 1 is a schematic vertical cross-sectional view showing the hollow-fiber membrane module according to the first embodiment of the present invention.

A hollow-fiber membrane module 100A shown in FIG. 1 includes a cylindrical case 2 open at both ends, and a plurality of hollow-fiber membranes 1 housed in the case 2. The case 2 includes a case upper cap 2a at the upper part thereof, and a case lower cap 2b at the lower part thereof. The case upper cap 2a has a filtered liquid outlet 7, and the case lower cap 2b has a raw liquid inflow port 5. Here, "upper" and "lower" refer to the upper and lower sides of the hollow-fiber membrane module 100A in use, and correspond to the upper and lower sides in FIG. 1.

Further, the hollow-fiber membrane module 100A includes a first potting part 3 and a second potting part 4.

Here, the upper end part of the case upper cap 2a, that is, the filtered liquid outlet 7 is a first end of the case 2, and the lower end part of the case lower cap 2b, that is, the raw liquid inflow port 5 is a second end of the case 2. In addition, a case side nozzle 2c is provided on the side surface of the case 2 near the first end of the case 2, and the case side nozzle 2c has a raw liquid outlet 6.

From the viewpoint of the pressure loss and membrane cleaning effect during flushing, the inside diameter D of the case side nozzle 2c is preferably set such that the flow velocity during the flushing in the case side nozzle 2c is in the range of from 0.5 m/s to 10 m/s, and is more preferably set such that the flow velocity during the flushing in the case side nozzle 2c is in the range of from 1 m/s to 5 m/s.

When the inside diameter D of the case side nozzle 2c is too small, the pressure loss during the flushing may increase and the power cost may increase. On the other hand, when the inside diameter D of the case side nozzle 2c is too large, the flow velocity during the flushing may be lowered, and the membrane cleaning effect may be lowered.

The first potting part 3 is also referred to as an upper potting part. The first potting part 3 is formed of an adhesive, and liquid-tightly and air-tightly bonds upper end parts of the hollow-fiber membranes 1 (corresponding to the "first ends of the hollow-fiber membranes") to the case 2 while end faces are open. That is, the hollow-fiber membranes 1 are bundled by the first potting part 3 and fixed to the inner wall of the case 2.

The second potting part 4 is also referred to as a lower potting part. The second potting part 4 is formed of an adhesive, and seals end faces of lower end parts of the hollow-fiber membranes 1 (corresponding to the "second ends of the hollow-fiber membranes") and bonds the lower end parts to the case 2. That is, the second potting part 4 is disposed to face the first potting part 3 in the case 2. In this manner, at the lower part of the hollow-fiber membrane module 100A, hollow parts of the hollow-fiber membranes 1 are sealed with an adhesive and do not open. The hollow-fiber membranes 1 are bundled by the second potting part 4 and fixed to the inner wall of the case 2.

The second potting part 4 has through holes 8 continuing from the surface facing the first potting part 3 to the reverse surface. The through hole 8 functions as a flow channel of the raw liquid and a flow channel of air during air scrubbing.

Figure 5:
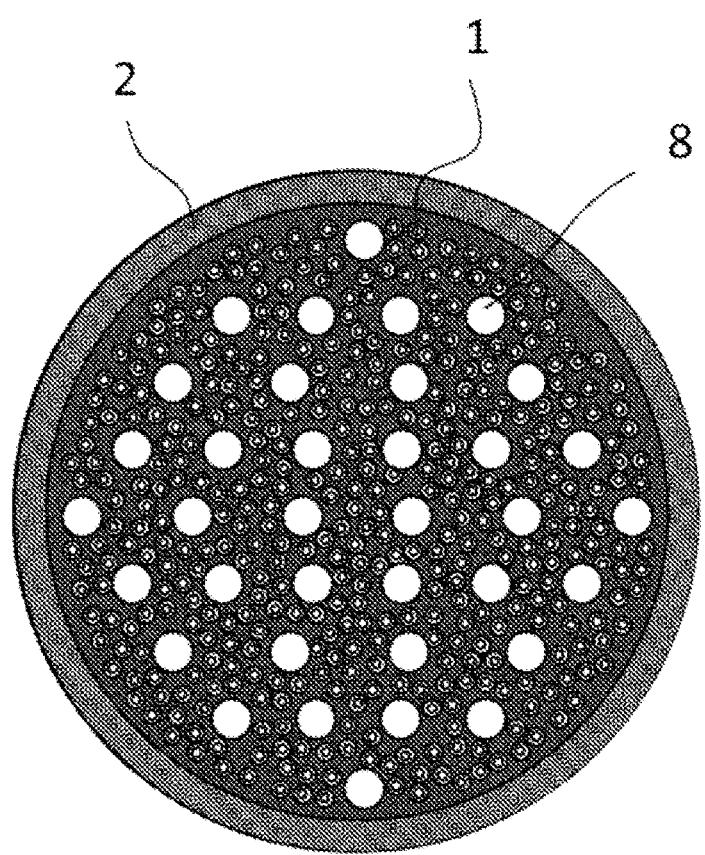
FIG. 5 is a B-B line cross-sectional view of the hollow-fiber membrane module of FIG. 1.

FIG. 5 is a B-B line cross-sectional view of the hollow-fiber membrane module 100A of FIG. 1 and shows an example of the arrangement of the through holes 8 in the second potting part 4. In order to prevent the drift of the raw liquid during the flushing and the drift of air during the air scrubbing, it is preferable that the through holes 8 be equally disposed in the second potting part 4.

<Flow-Regulating Structure>

Figure 2:
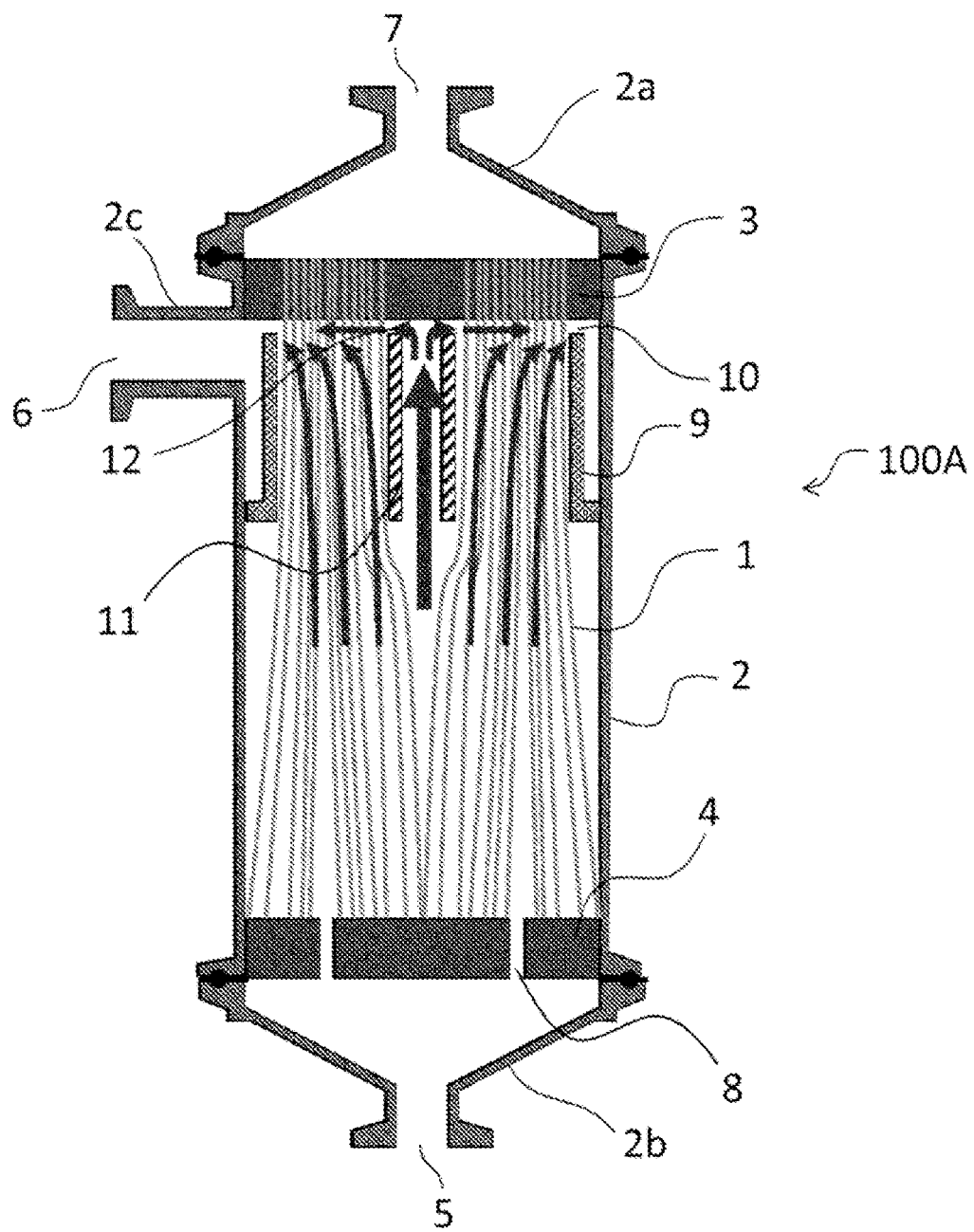
FIG. 2 is a schematic vertical cross-sectional view showing a liquid flow in the hollow-fiber membrane module of FIG. 1.

As shown in FIG. 2, the hollow-fiber membrane module 100A further has a flow-regulating structure by which a fluid flowing outside the hollow-fiber membranes 1 from the second end side of the case 2 to the first end side of the case 2 is made into a flow directed to a radial center part on the second end side of the first potting part 3, and is further made into a radial flow directed from a radial center part to a radially outer peripheral side on the second end side of the first potting part 3.

The flow-regulating structure includes a flow-regulating cylinder 9 and an inner pipe 11.

The flow-regulating cylinder 9 is a cylindrical member disposed inside the case 2. The flow-regulating cylinder 9 is disposed on the second end side (lower side) of the first potting part 3. The flow-regulating cylinder 9 opens on the upper and lower surface thereof, and is provided with flow-regulating holes 10 on the side surface thereof. The liquid passing through the flow-regulating cylinder 9 can can pass through from the flow-regulating holes 10.

Meanwhile, the inner pipe 11 is a cylindrical member disposed on the module radial center part than the flow-regulating cylinder 9, and is disposed on the second end side (lower side) of the first potting part 3. The upper side of the inner pipe 11 is fixed to the first potting part 3 and the lower side thereof is open. In addition, side opening parts 12 are provided on the side surface of the inner pipe 11.

In the filtration operation of the hollow-fiber membrane module 100A, the raw liquid is supplied from the raw liquid inflow port 5 into the module, and the raw liquid is filtered from the outer side to the inner side of the hollow-fiber membranes 1. The filtered liquid passes through the hollow parts of the hollow-fiber membranes 1 and is discharged from the upper filtered liquid outlet 7 to the outside. Here, pressure loss occurs when the filtered liquid passes through the hollow parts of the hollow-fiber membranes 1, but the closer to the first end side (upper side) of the module, the shorter the flow distance of the filtered liquid in the hollow parts and the smaller the pressure loss, so that the filtration flux becomes high.

That is, in the hollow-fiber membranes 1, the filtration flux in the vicinity of the second end side (lower side) of the first potting part 3 is high, and suspended solids tend to be accumulated on the membrane surface. Therefore, in the case of filtering a raw liquid having a high turbidity, it is important to improve the membrane cleaning effect in the vicinity of the second end side (lower side) of the first potting part 3.

Figure 10:
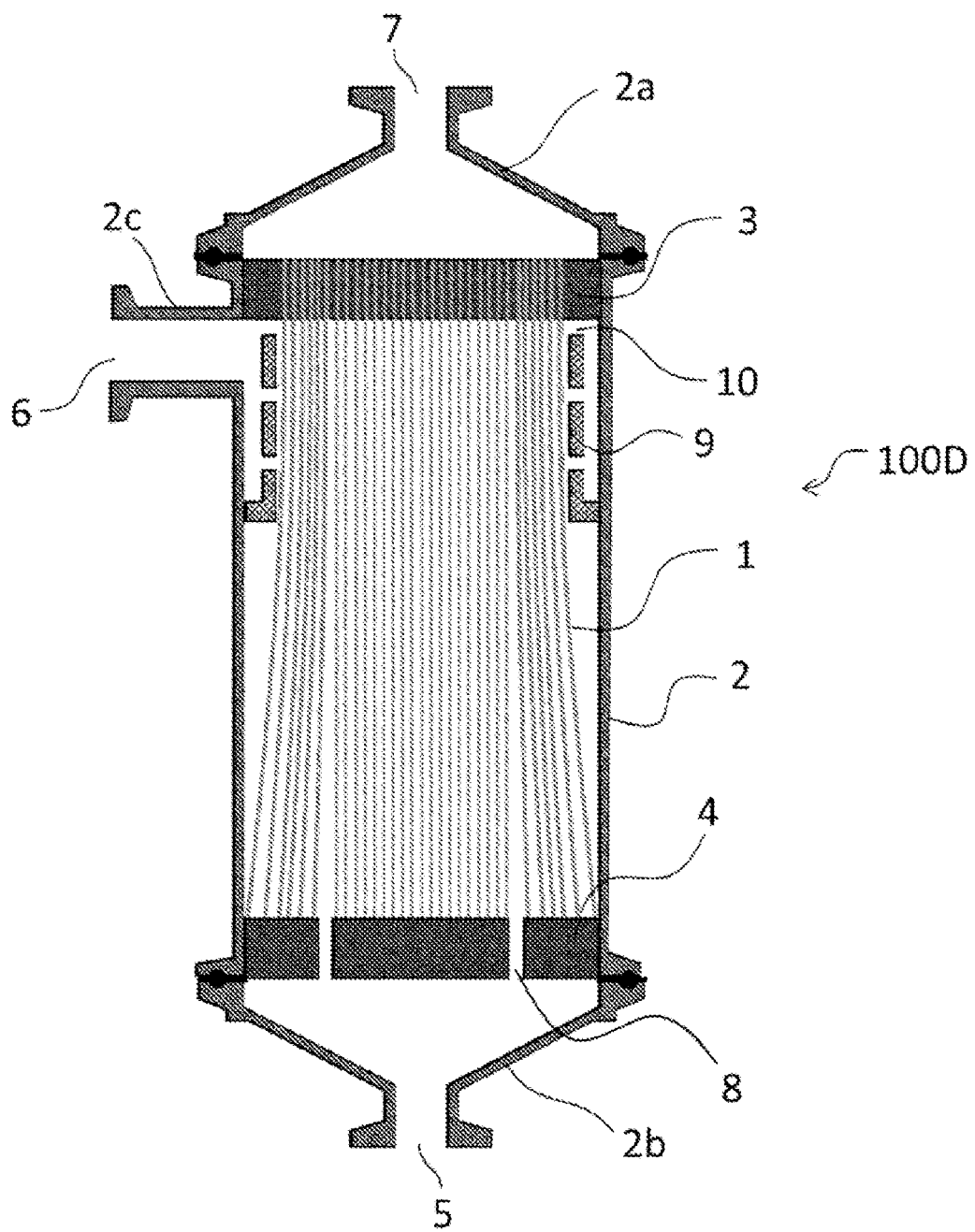
FIG. 10 is a schematic vertical cross-sectional view showing an example of a hollow-fiber membrane module in the related art.
Figure 11:
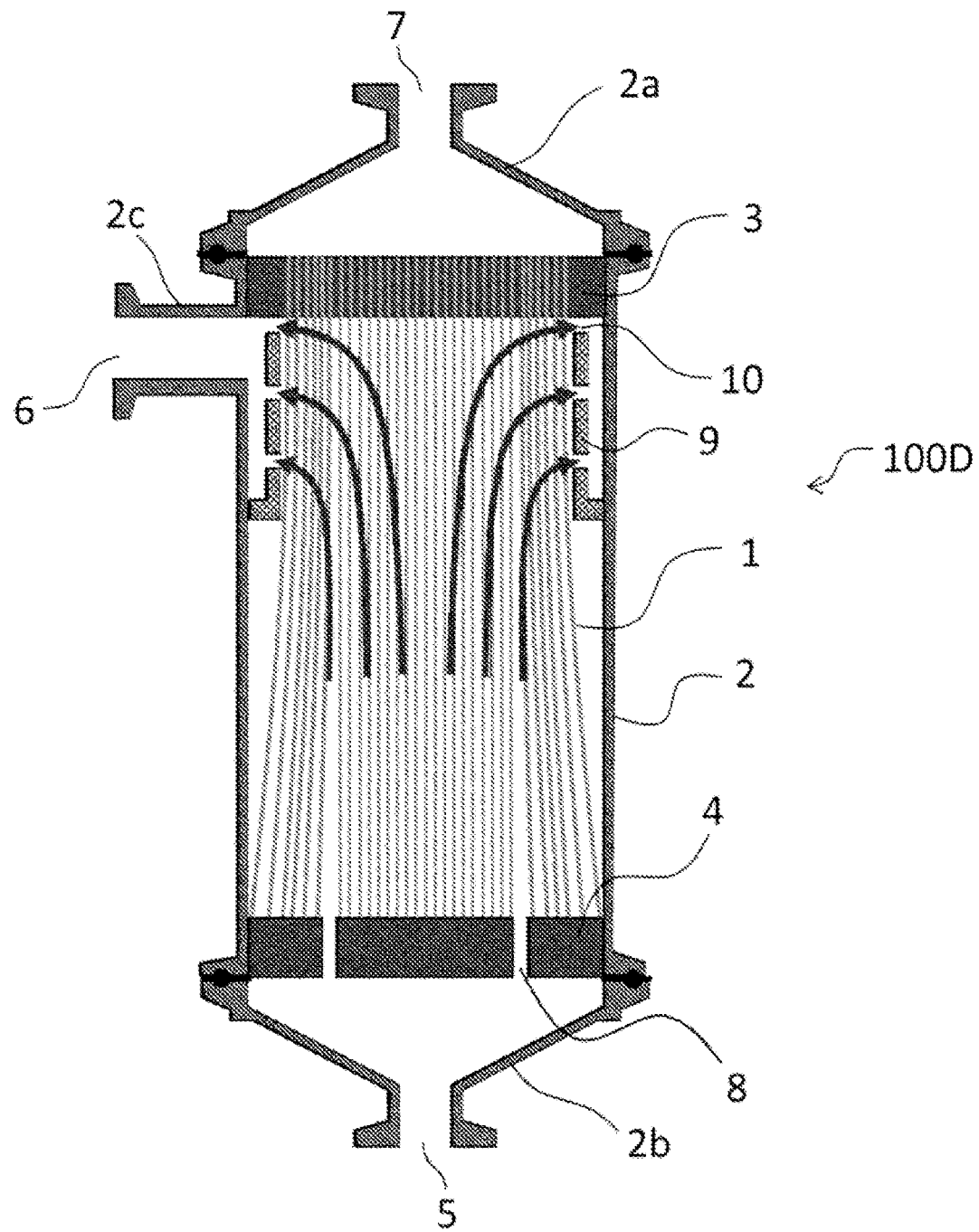
FIG. 11 is a schematic vertical cross-sectional view showing a liquid flow in the related-art hollow-fiber membrane module of FIG. 10.

FIG. 10 shows a structure of a hollow-fiber membrane module 100D which includes only the flow-regulating cylinder 9 and in which the hollow-fiber membranes 1 are uniformly disposed in the case 2, as an example of a related-art hollow-fiber membrane module in which suspended solids tend to be accumulated on the membrane surface, and FIG. 11 shows the liquid flow in the hollow-fiber membrane module 100D during the flushing.

In the related-art hollow-fiber membrane module 100D, during the flushing, the raw liquid is supplied from the raw liquid inflow port 5 and the raw liquid is discharged from the raw liquid outlet 6 to clean the inside of the module, but since the flow from the second end side (lower side) of the module is directed to the flow-regulating holes 10 at the first end side (upper side) of the module, in the vicinity of the second end side (lower side) of the first potting part 3, the flow velocity is low and the accumulated suspended solids are not sufficiently cleaned. In the module radial center part in the vicinity of the second end side (lower side) of the first potting part 3, the flow velocity is particularly low and the suspended solids tend to be accumulated.

Though the flow velocity required for the discharge of the suspended solids changes depending on the particle size, specific gravity, and interaction with the hollow-fiber membranes of the suspended solids, it is preferably 0.05 m/s or more, more preferable to 0.1 m/s or more, and still more preferable 0.2 m/s or more.

Therefore, in the first embodiment of the present invention, in order to increase the flow velocity during the flushing in the vicinity of the second end side (lower side) of the first potting part 3 and to improve the membrane cleaning effect, the flow-regulating cylinder 9 and the inner pipe 11 are provided as a flow-regulating structure.

This flow-regulating structure is provided to improve the membrane cleaning effect in the vicinity of the second end side (lower side) of the first potting part 3 by causing the raw liquid flowing outside the hollow-fiber membranes 1 from the second end side (lower side) of the module to the first end side (upper side) of the module during the flushing to generate a flow directed to the module radial center part on the second end side (lower side) of the first potting part 3, and to further generate a radial flow directed from the module radial center part to a radially outer peripheral side on the second end side (lower side) of the first potting part 3.

The raw liquid directed from the second end side (lower side) of the module to the first end side (upper side) of the module passes through the inside of the inner pipe 11 and is introduced to the module radial center part on the second end side (lower side) of the first potting part 3, and thereafter the raw liquid flowing from the side opening parts 12 of the inner pipe 11 flows to the flow-regulating holes 10 of the flow-regulating cylinder 9.

Figure 4:
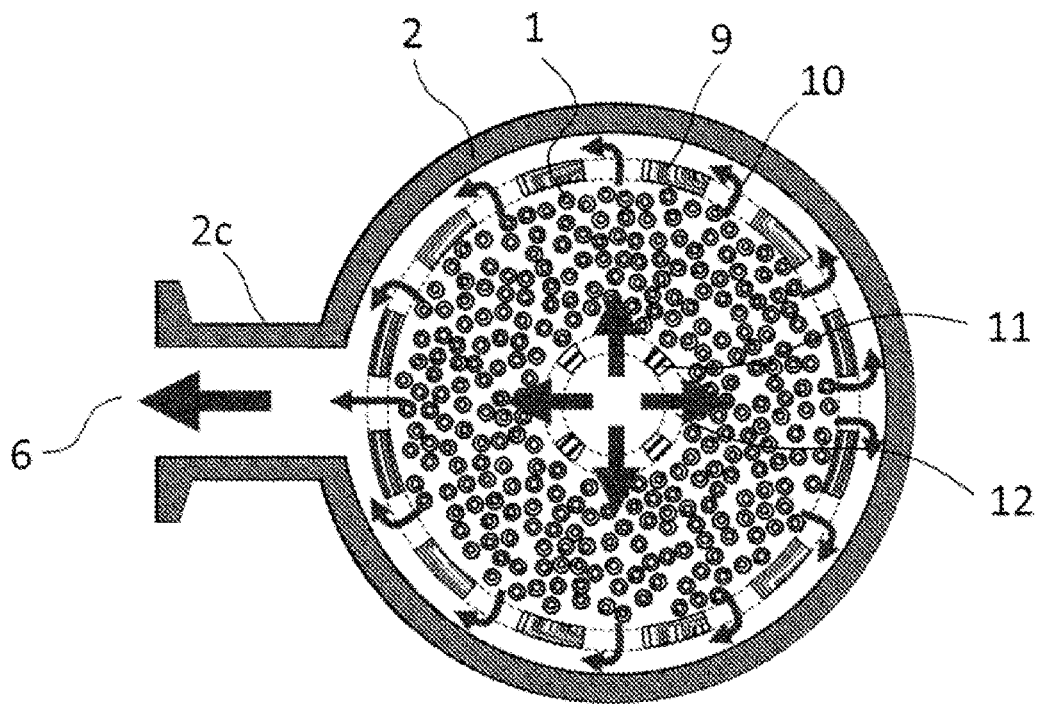
FIG. 4 is a cross-sectional view showing a liquid flow in FIG. 3.

With this flow-regulating structure, in the vicinity of the second end side (lower side) of the first potting part 3, a radial flow is generated from the module radial center part to the radially outer peripheral side, and the accumulated suspended solids can be washed away. The raw liquid flowing out of the flow-regulating holes 10 is discharged from the raw liquid outlet 6 through the flow channel between the flow-regulating cylinder 9 and the case 2 as shown in FIG. 4.

<Flow Parameter F>

Here, in order to introduce the raw liquid into the inside of the inner pipe 11 during the flushing, the filling ratio A1 of the hollow-fiber membranes inside of the inner pipe 11 needs to be smaller than the filling ratio A2 of the hollow-fiber membranes outside of the inner pipe 11. This is because by setting the filling ratio A1 of the hollow-fiber membranes inside of the inner pipe 11 smaller than the filling ratio A2 of the hollow-fiber membranes outside of the inner pipe 11, the liquid flow resistance is lowered and the flow velocity inside the inner pipe 11 is increased.

Here, the filling ratio of the hollow-fiber membranes refers to the proportion of the area occupied by the hollow-fiber membranes in a cross section (plane parallel to the left-right direction of FIG. 1 and perpendicular to the paper surface, hereinafter also referred to as "cross section") perpendicular to the axial direction of the case 2 of the hollow-fiber membrane module between the first potting part 3 and the second potting part 4. Defining the cross-sectional area of the cross section of the hollow-fiber membrane existing section inside the case 2 as S1 and the total cross-sectional area of the cross section of the hollow-fiber membranes as S2, the filling ratio of the hollow-fiber membranes can be represented by the following formula (2).

$$\text{Filling ratio of hollow-fiber membranes [\%]} = S2/S1 \times 100 \quad (2)$$

Here, the hollow-fiber membrane existing section refers to a section in which the hollow-fiber membranes exist. Examples of a method of dividing the section include a method of dividing by members such as the case 2, the flow-regulating cylinder 9 and the inner pipe 11, and a method of dividing by fixing the hollow-fiber membranes at the potting part as in a hollow-fiber membrane module 100B of FIG. 6.

Figure 3:
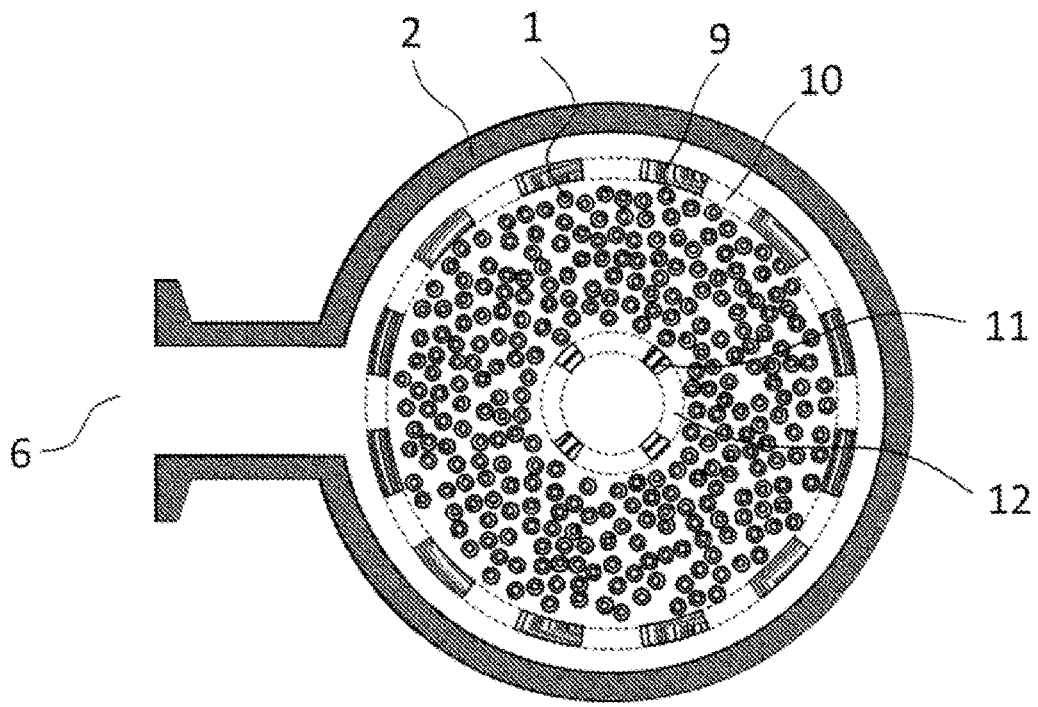
FIG. 3 is an A-A line cross-sectional view of the hollow-fiber membrane module of FIG. 1.

For example, FIG. 3 shows an A-A line cross-sectional view of the hollow-fiber membrane module 100A of FIG. 1, and the hollow-fiber membranes 1 exist in the space between the flow-regulating cylinder 9 and the inner pipe 11. Therefore, in FIG. 3, the area obtained by subtracting the cross-sectional area (outside diameter reference) of the inner pipe 11 from the inner cross-sectional area of the flow-regulating cylinder 9 is the cross-sectional area S1 of the hollow-fiber membrane existing section. The filling ratio of the hollow-fiber membranes in the section in which the hollow-fiber membranes do not exist is 0%.

In present description, the inner cross-sectional area of the case 2, the flow-regulating cylinder 9 or the inner pipe 11 refers to the cross-sectional area of the hollow part of the case 2, the flow-regulating cylinder 9 or the inner pipe 11 on the cross section perpendicular to the axial direction of the hollow-fiber membrane module of the case 2, the flow-regulating cylinder 9 or the inner pipe 11.

Here, the total cross-sectional area S2 of the cross section of the hollow-fiber membranes can be represented by the following formula (3). The outside diameters of 10 hollow-fiber membranes in the hollow-fiber membrane existing section are measured in two directions, the longest direction and the short direction, respectively. The average value of the measurement values of a total of 20 points is taken as the outside diameter R of the hollow-fiber membrane. Using the outside diameter R and assuming that the cross section of the hollow-fiber membrane is a perfect circle, the total cross-sectional area S2 of the cross section of the hollow-fiber membrane is calculated by the formula (3). In the case where less than 10 hollow-fiber membranes exist in the hollow-fiber membrane existing section, the outside diameters of all the hollow-fiber membranes existing in the hollow-fiber membrane existing section may be measured so as to calculate the average value thereof.

$$S2 = [\text{circular constant}] \times [\text{outside diameter of hollow-fiber membrane}/2]^2 \times [\text{number of hollow-fiber membranes in hollow-fiber membrane existing section}] \quad (3)$$

Here, as the filling ratio A1 of the hollow-fiber membranes inside of the inner pipe 11 lowers, the liquid flow resistance in the inner pipe 11 lowers. The filling ratio A1 of the hollow-fiber membranes inside of the inner pipe 11 is preferably from 0% to 50%, more preferably from 0% to 40%, and still more preferably from 0% to 30%.

On the other hand, the filling ratio A2 of the hollow-fiber membranes outside of the inner pipe 11 may be appropriately set in consideration of the balance with the filling ratio A1 of the hollow-fiber membranes inside of the inner pipe 11, and is preferably from 20% to 70%, more preferably from 30% to 60%, and still more preferably from 40% to 60%.

In the case where the inner pipe 11 has a tapered shape in which the diameter changes depending on its portion, the filling ratios of the hollow-fiber membranes inside and outside of the inner pipe 11 are measured at each of the first end side and the second end side of the inner pipe 11. Then, the average value of the filling ratios of the hollow-fiber membranes inside of the inner pipe 11 at the first end side and the second end side is taken as the filling ratio A1 of the hollow-fiber membranes inside of the inner pipe 11. Then, the average value of the filling ratios of the hollow-fiber membrane outside of the inner pipe 11 at the first end side and the second end side is taken as the filling ratio A2 of the hollow-fiber membrane outside of the inner pipe 11.

Here, defining the cross-sectional area (inner cross-sectional area) of the inner pipe 11 as T1 and the cross-sectional area (inner cross-sectional area) of the case 2 as T2, the flow parameter F of following formula (1) is preferably from 1.0 to 8.0.

$$F=(A2-A1)\times T1/T2 \quad (1)$$

In the formula (1), (A2–A1) is a difference between the filling ratios of the hollow-fiber membranes outside and inside of the inner pipe 11, and represents a difference in the liquid flow resistance between the outside and the inside of the inner pipe 11. The larger the value (A2–A1), the easier the raw liquid flows inside of the inner pipe 11. Meanwhile, T1/T2 represents the proportion of the cross-sectional area of the inner pipe 11 to the cross-sectional area of the case 2. The larger the T1/T2, the easier the raw liquid flows inside of the inner pipe 11.

In order to sufficiently introduce the raw liquid to the inside of the inner pipe 11 and to improve the membrane cleaning effect in the vicinity of the second end side (lower side) of the first potting part 3, the flow parameter F of the formula (1) is preferably from 1.0 to 8.0, and more preferable from 2.0 to 8.0.

When the flow parameter F is less than 1.0, the flow velocity inside of the inner pipe 11 may be lowered, and the sufficient membrane cleaning effect may not be obtained in the vicinity of the second end side (lower side) of the first potting part 3. On the other hand, when the flow parameter F is more than 8.0, the flow velocity outside of the inner pipe 11 may be significantly lowered, and the membrane cleaning effect of the hollow-fiber membranes outside of the inner pipe 11 may be lowered.

In the case where the inner pipe 11 has a tapered shape in which the diameter changes depending on its portion, the inner cross-sectional area of the inner pipe 11 is measured at each of the first end side and the second end side of the inner pipe 11. Then, the average value of the inner cross-sectional areas of the inner pipe 11 at the first end side and the second end side is taken as the cross-sectional area (inner cross-sectional area) T1 of the inner pipe 11.

<Length of Inner Pipe>

In the hollow-fiber membrane module 100A of the first embodiment, the length of the inner pipe 11 (the axial direction of the hollow-fiber membrane module) is preferably equal to or greater than the inside diameter D of the case side nozzle 2c, more preferably 1.5×D or more, and still more preferably 2×D or more. Here, the length of the inner pipe 11 is a length from the second end side (lower side) of the first potting part 3 to the second end side (lower side) of the inner pipe 11.

When the length of the inner pipe 11 is less than the inside diameter D of the case side nozzle 2c, the flow from the second end side (lower side) of the module may be dispersed in the radial direction of the module before reaching the inner pipe 11, and the flow velocity inside of the inner pipe 11 may not be sufficiently increased. On the other hand, defining the length from the second end side (lower side) of the first potting part 3 to the second end (raw liquid inflow port 5) of the case 2 as L, the length of the inner pipe 11 is preferably L or less, more preferably 60×D or less, still more preferably 40×D or less, and still more preferably 5×D or less.

The inner pipe 11 may pass through the second potting part 4 and may extend to the second end side of the case 2. When the inner pipe 11 is long, difference in the liquid flow resistance between the inside and the outside of the inner pipe 11 is increased. Consequently, the flow velocity inside of the inner pipe 11 is improved, and the membrane cleaning effect in the vicinity of the second end side (lower side) of the first potting part 3 is improved. While on the other hand, since the flow velocity outside of the inner pipe 11 is lowered, the membrane cleaning effect outside of the inner pipe 11 may sometimes be lowered.

<Side Opening Part of Inner Pipe>

The inner pipe 11 has one or more side opening parts 12 on the side surface thereof. The side opening parts 12 exist in the range of the length D (inside diameter of the case side nozzle 2c) from the second end side (lower side) of the first potting part 3 are referred to as first side opening parts. In order to increase the flow velocity in the vicinity of the second end side (lower side) of the first potting part 3, it is preferable to increase the proportion of the total opening area of the first side opening parts of the inner pipe 11. In the total opening area of the side opening parts 12 of the inner pipe 11, the proportion R1 (formula 4) of the total opening area occupied by the first side opening parts is preferably 50% or more, and more preferably 80% or more.

$$R1[\%]=[\text{total opening area of first side opening parts}]/[\text{total opening area of side opening parts}]\times 100 \quad (4)$$

In addition, since as the first side opening parts of the inner pipe 11 are closer to the second end side (lower side) of the first potting part 3, the flow velocity in the vicinity of the second end side (lower side) of the first potting part 3 can be further increased, it is preferable that the first side opening parts are in contact with the second end side of the first potting part 3.

Further, the proportion R2 (formula 5) of the total opening area of the first side opening parts of the inner pipe 11 to the inner cross-sectional area T2 of the case 2 is preferably from 5% to 50%, and more preferably from 10% to 40%. When R2 is less than 5%, the opening area of the first side opening parts may be too small to spread the flow sufficiently therearound. On the other hand, when R2 is more than 50%, the opening area of the first side opening parts is too large, and the flow velocity in the vicinity of the second end side (lower side) of the first potting part 3 may be lowered.

$$R2[\%]=[\text{total opening area of first side opening parts}]/T2\times 100 \quad (5)$$

In order to generate a radial flow from the side opening parts 12, the side opening parts 12 are preferably disposed substantially evenly in the circumferential direction of the inner pipe 11. When the side opening parts 12 are not disposed unevenly, a drift may occur in the flow from the side opening parts 12, and a part with a low flow velocity may be generated. The side opening parts 12 may be disposed at regular intervals in the circumferential direction of the inner pipe 11, or may be disposed in a staggered manner or the like. The shape of the side opening parts 12 is not particularly limited, and may be circular, oval, rectangular or the like.

In addition, the side opening parts 12 can also be provided over the entire circumference of the inner pipe 11. Further, the inner pipe 11 can be provided in the module by a method of fixing the same with the first potting part 3 or the second potting part 4 or a method of connecting and fixing the flow-regulating cylinder 9 or the case 2 via a shaft or the like.

<Flow-Regulating Cylinder>

The flow-regulating cylinder 9 has one or more flow-regulating holes 10 on the side surface thereof, and the proportion R3 (formula 6) of the total opening area of the flow-regulating holes to the inner cross-sectional area T2 of the case 2 is preferably from 5% to 50%, more preferably from 10% to 40%, and still more preferably from 15% to 30%. When R3 is less than 5%, the opening area of the flow-regulating holes is too small, a drift may occur inside of the flow-regulating cylinder 9 and a part with a low flow velocity may be generated. On the other hand, when R3 is more than 50%, the opening area of the first side opening parts is too large, and the flow velocity in the vicinity of the second end side (lower side) of the first potting part 3 may be lowered.

$$R3[\%]=[\text{total opening area of flow-regulating holes}]/[T2]\times 100 \quad (6)$$

Among the flow-regulating holes 10, the flow-regulating holes 10 existing in the range of the length D (inside diameter of the case side nozzle 2c) from the second end side (lower side) of the first potting part 3 are referred to as first flow-regulating holes. In order to increase the flow velocity in the vicinity of the second end side (lower side) of the first potting part 3, it is preferable to increase the proportion of the total opening area of the first flow-regulating holes. In the total opening area of the flow-regulating holes 10, the proportion R4 (formula 7) of the total opening area occupied by the first flow-regulating holes is preferably 50% or more, and more preferably 80% or more. In addition, since as the first flow-regulating holes are closer to the second end side (lower side) of the first potting part 3, the flow velocity in the vicinity of the second end side (lower side) of the first potting part 3 can be further increased, it is preferable that the first flow-regulating holes are in contact with the second end side of the first potting part 3.

$$R4[\%]=[\text{total opening area of first flow-regulating holes}]/[\text{total opening area of flow-regulating holes}]\times 100 \quad (7)$$

In order to generate a radial flow inside of the flow-regulating cylinder 9, it is preferable that the flow-regulating holes 10 are disposed substantially evenly in the circumferential direction of the flow-regulating cylinder 9. When the flow-regulating holes 10 are not disposed evenly, a drift may occur in the flow inside of the flow-regulating cylinder 9, and a part with a low flow velocity may be generated. The flow-regulating holes 10 may be disposed at regular intervals in the circumferential direction of the flow-regulating cylinder 9, or may be disposed in a staggered manner or the like. The shape of the flow-regulating holes 10 is not particularly limited, and may be circular, oval, rectangular or the like.

In addition, the flow-regulating holes 10 can also be provided over the entire circumference of the flow-regulating cylinder 9. Further, the flow-regulating cylinder 9 can be provided in the module by a method of fixing the same with the first potting part 3 or a method of bonding and fixing the same to the case 2.

Figure 15:
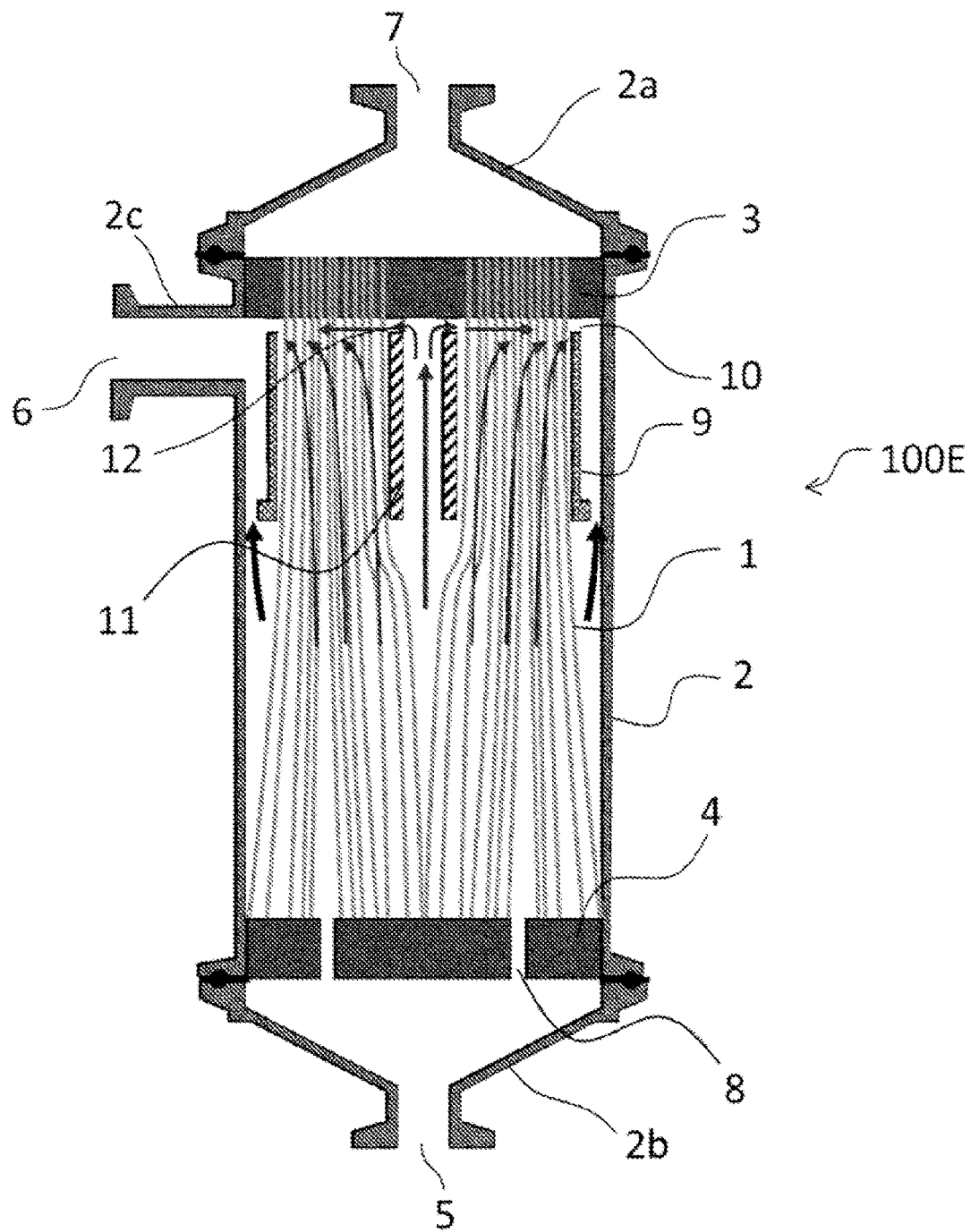
FIG. 15 is a schematic vertical cross-sectional view showing an example of the liquid flow in the hollow-fiber membrane module of the present invention.

In order to increase the flow velocity in the vicinity of the second end side (lower side) of the first potting part 3, it is preferable to reduce a clearance between the second end side (lower side) of the flow-regulating cylinder 9 and the case 2. When there is a large clearance between the second end side (lower side) of the flow-regulating cylinder 9 and the case 2, as shown in FIG. 15, the raw liquid is released from the clearance portion during the flushing, and the flow velocity at the second end side (lower side) of the first potting part 3 is lowered. The cross-sectional area of the clearance between the second end side (lower side) of the flow-regulating cylinder 9 and the case 2 in the radial direction of the hollow-fiber membrane module is preferably 50% or less and more preferably 20% or less of the total opening area of the flow-regulating holes 10.

As shown in FIG. 4, the flow out of the flow-regulating holes 10 flows through the flow channel between the flow-regulating cylinder 9 and the case 2 to the case side nozzle 2c and is discharged from the raw liquid outlet 6, and it is preferable to increase the cross-sectional area of the flow channel. When the cross-sectional area of the flow channel between the flow-regulating cylinder 9 and the case 2 is small, the pressure loss during the liquid flow may be increased, and the flow velocity from the flow-regulating holes 10 distant from the case side nozzle 2c may be lowered. As a result, a drift may occur inside of the flow-regulating cylinder 9 and a part with a low flow velocity may be generated. That is, the flow velocity on the side facing the case side nozzle 2c may be lowered.

The cross-sectional area of the flow channel between the flow-regulating cylinder 9 and the case 2 in the axial direction of the hollow-fiber membrane module is preferably 3% or more, more preferably 5% or more, and still more preferably 10% or more of the inner cross-sectional area T2 of the case 2. In addition, in order to ensure a flow channel between the flow-regulating cylinder 9 and the case 2, the diameter of the case 2 may be enlarged at an outer peripheral portion of the flow-regulating cylinder 9, as shown in FIG. 16.

Figure 16:
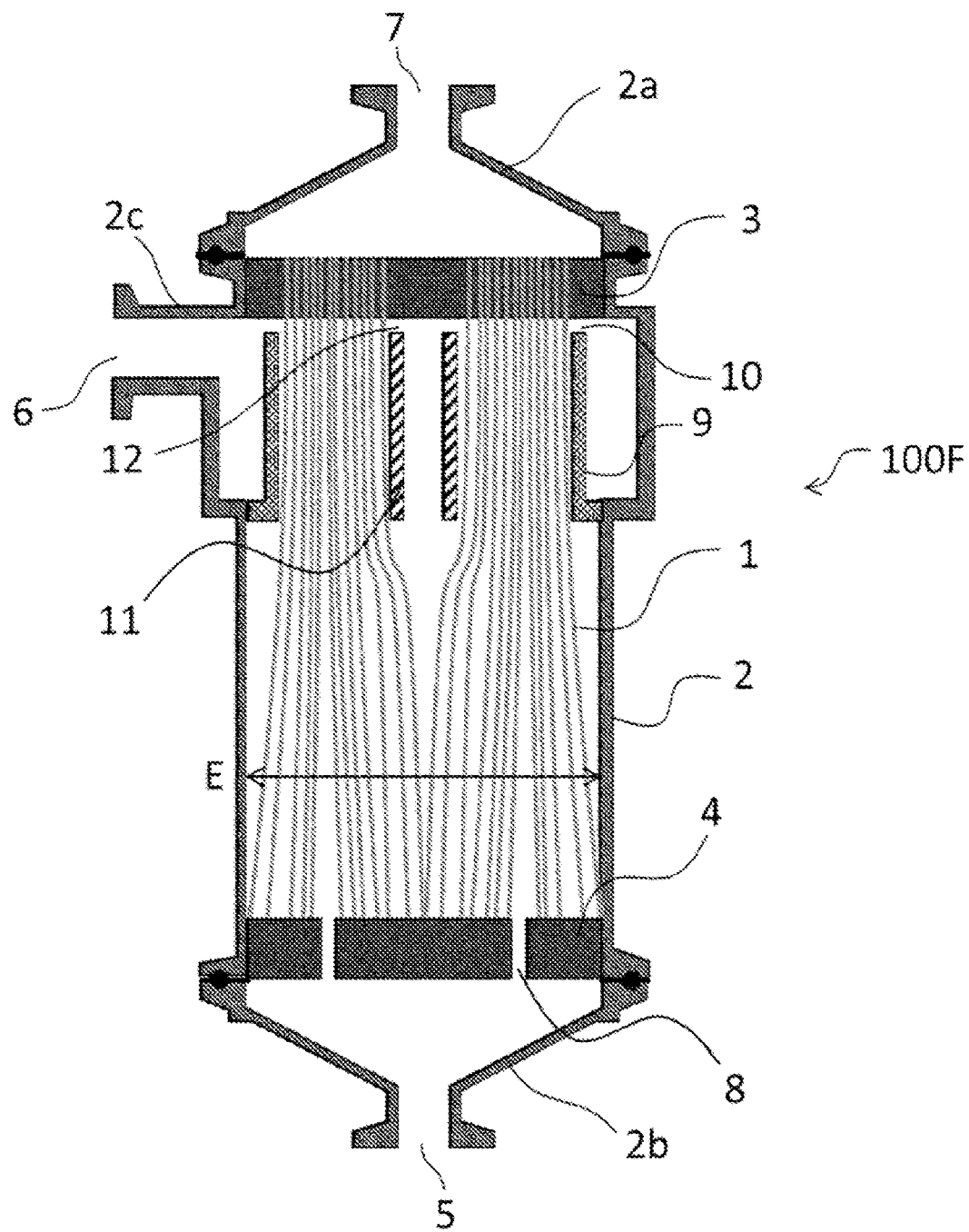
FIG. 16 is a schematic vertical cross-sectional view showing an example of the hollow-fiber membrane module of the present invention.

The inner cross-sectional area T2 of the case 2 is described in the present description, such as in the formula (1), the formula (5) and the formula (6), and in the case where the case 2 is enlarged at the outer peripheral portion of the flow-regulating cylinder 9 as in FIG. 16, the inner cross-sectional area T2 of the case 2 uses a value calculated based on the inside diameter E of the case 2 at a part on the second end side (lower side) of the flow-regulating cylinder 9. That is, the inner cross-sectional area T2 is calculated based on the inside diameter of the case 2 of the portion whose inside diameter is not enlarged.

The inside diameter of the flow-regulating cylinder 9 may be set appropriately, and is preferably from 80% to 120%, and more preferably from 90% to 110% of the inside diameter E of the case 2 at a portion on the second end side of the flow-regulating cylinder 9. Since the hollow-fiber membranes are packed inside of the flow-regulating cylinder 9, when the inside diameter of the flow-regulating cylinder 9 is less than 80% of E, the number of fillable hollow-fiber membranes may decrease and the membrane area of the hollow-fiber membrane module may decrease. When the inside diameter of the flow-regulating cylinder 9 is more than 120% of E, the diameter of the first end side of the case 2 needs to be greatly increased, and the manufacturing cost may be increased.

<Method for Manufacturing Hollow-Fiber Membrane Module>

Bundling hollow-fiber membranes together with an adhesive is referred to as potting. Representative examples of the potting method include a centrifugal potting method in which a liquid potting agent (adhesive) is infiltrated between the hollow-fiber membranes using a centrifugal force and then cured, and a static potting method in which a liquid potting agent is infiltrated between the hollow-fiber membranes by delivering the liquid potting agent with a metering pump or head and letting the same flow naturally and then cured. In the centrifugal potting method, the potting agent can be easily infiltrated between the hollow-fiber membranes by a centrifugal force, and a high-viscosity potting agent can also be used.

Figure 12:
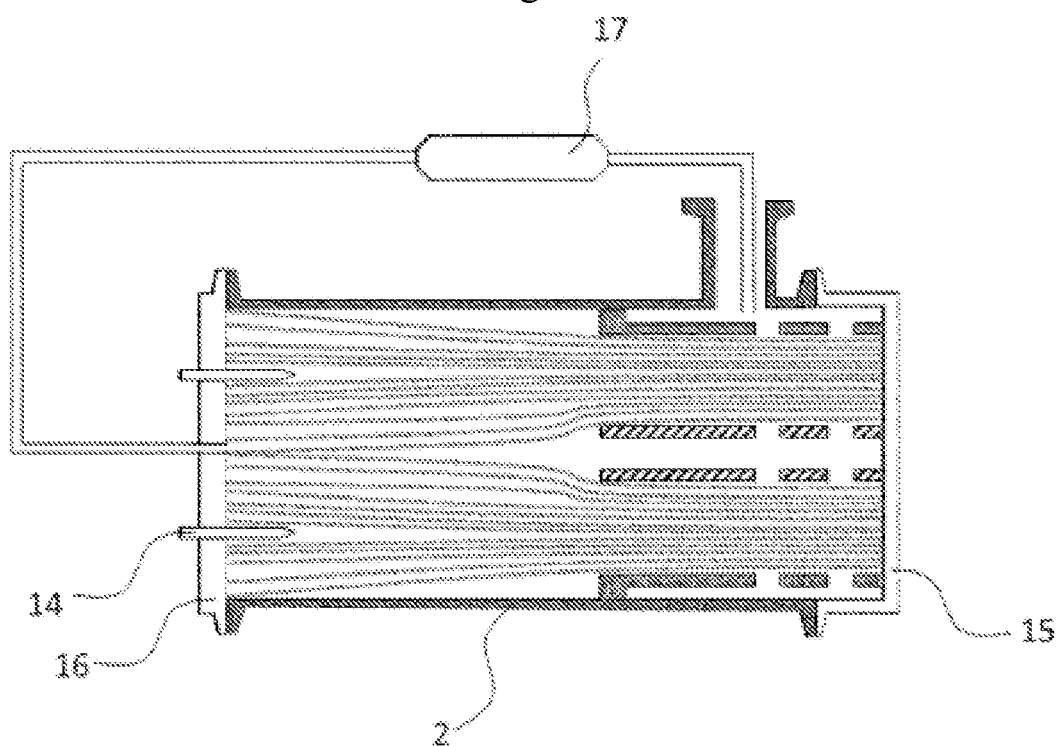
FIG. 12 is a schematic view illustrating an example of a method of manufacturing the hollow-fiber membrane module of the present invention.

An example of centrifugal potting of the hollow-fiber membrane module is described with reference to FIG. 12, FIG. 13 and FIG. 14. As shown in FIG. 12, a member such as a flow-regulating cylinder, an inner pipe and a hollow-fiber membrane is loaded into the case 2, a first potting cap 15 is provided on the first end side, and a second potting cap 16 is provided on the second end side. At this time, the first end side of the hollow-fiber membrane is preliminarily subjected to a sealing treatment to prevent the potting agent from penetrating into the hollow part. In addition, pins 14 for forming the through holes 8 are inserted into the second potting cap 16.

Figure 13:
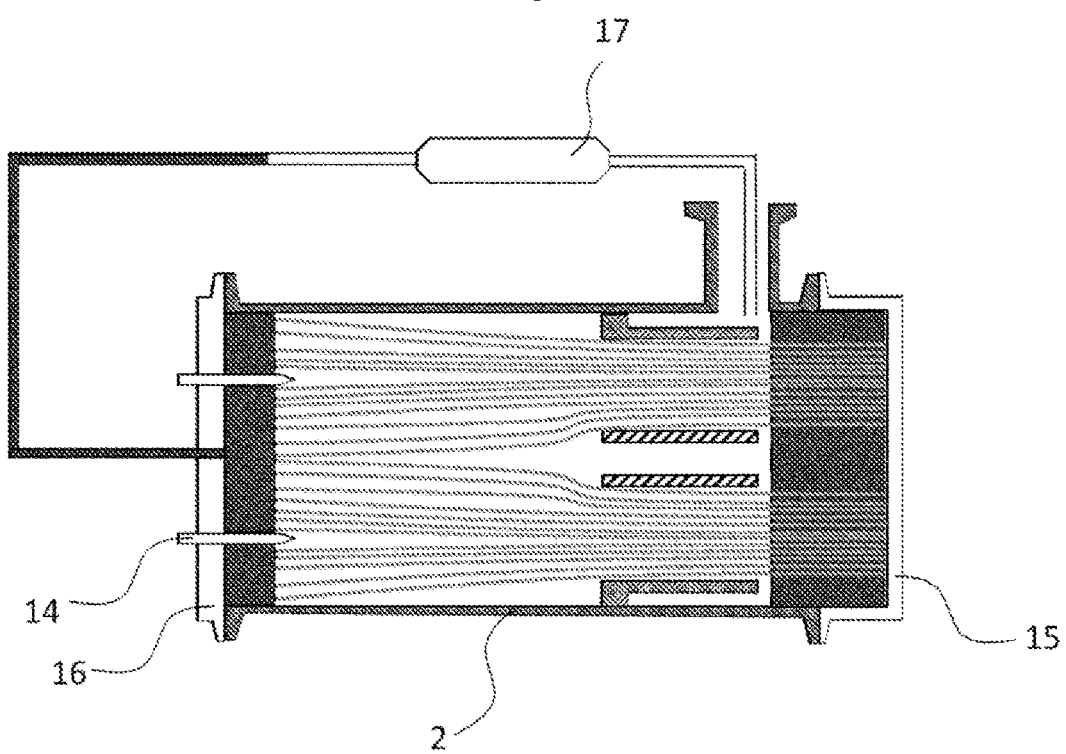
FIG. 13 is a schematic view illustrating an example of a method of manufacturing the hollow-fiber membrane module of the present invention.
Figure 14:
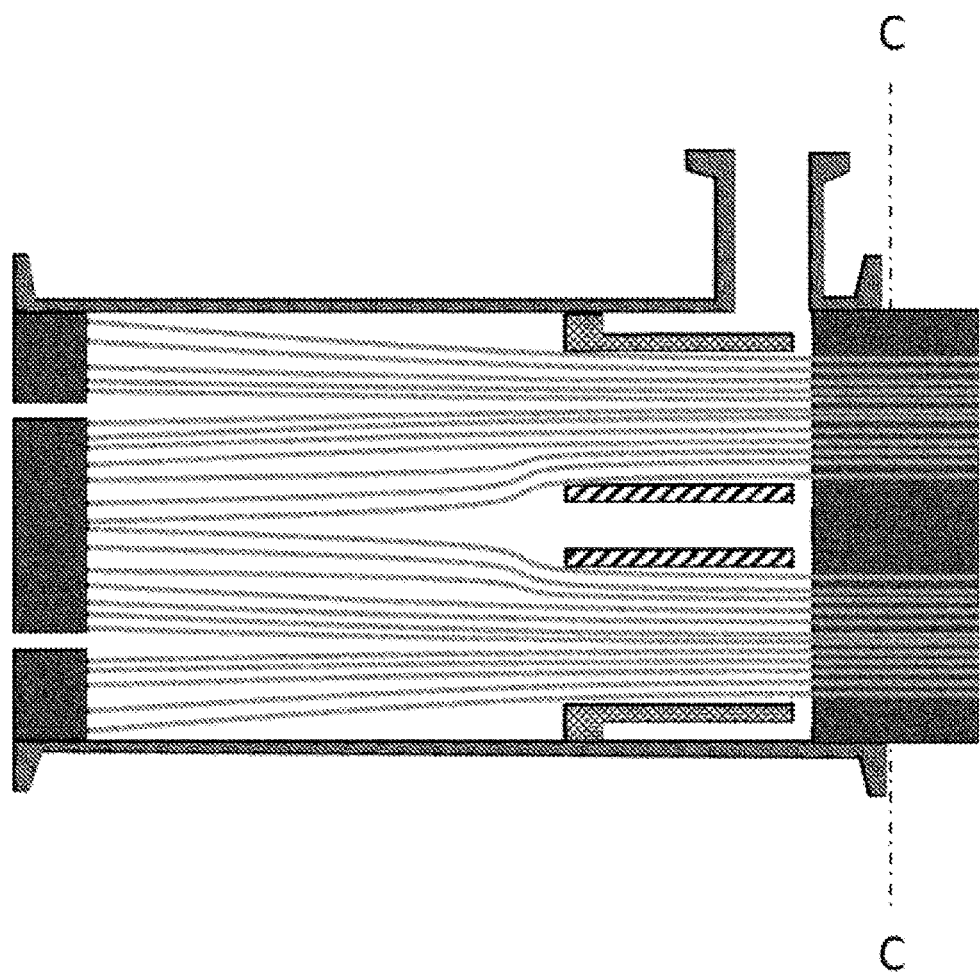
FIG. 14 is a schematic view illustrating an example of a method of manufacturing the hollow-fiber membrane module of the present invention.

Subsequently, as shown in FIG. 13, the potting agent is delivered from a potting agent charging fixture 17 to the first end side and the second end side of the hollow-fiber membrane. The potting agent is delivered by a centrifugal force by rotating the hollow-fiber membrane module, and the rotation is continued until the potting agent cures. Here, the potting agent also penetrates into the hollow part at the second end side of the hollow-fiber membrane, and the hollow part is closed.

When the pins 14 are pulled out after the potting agent cures, the through holes 8 are formed. Thereafter, the hollow part of the hollow-fiber membrane can be opened by removing the first potting cap 15 and the second potting cap 16 and cutting the potting agent along the line CC in FIG. 14. Finally, the case upper cap 2a and the case lower cap 2b are liquid-tightly and air-tightly fixed to complete a hollow-fiber membrane module.

The type of the potting agent to be used is not particularly limited, and for example, an epoxy resin, a polyurethane and a silicone resin can be used.

<Hollow-Fiber Membrane>

The hollow-fiber membrane module of the present embodiment includes hollow-fiber membranes as separation membranes. The hollow-fiber membranes are advantageous because generally they have a specific surface area larger than that of flat membranes and a larger amount of liquid that can be filtered per unit time. Examples of a structure of the hollow-fiber membrane include a symmetrical membrane with overall uniform pore size, an asymmetric membrane whose pore size changes in the thickness direction of the membrane, and a composite membrane having a support layer for maintaining strength and a separation functional layer for separating a target substance.

The average pore size of the hollow-fiber membrane may be appropriately selected depending on the separation object, and it is preferably from 10 nm to 1000 nm in the case of separating microorganisms. When the average pore size is less than 10 nm, the water permeability is lowered, and when the average pore size is more than 1000 nm, the microorganisms may leak. Meanwhile, when separation of low molecular weight proteins or the like is to be performed, it is preferable to use a hollow-fiber membrane having an average pore size of from 2 nm to 20 nm. The average pore size in the present invention refers to a pore size of a dense layer having the smallest pore size.

The material of the hollow-fiber membrane is not particularly limited, and can contain, for example, fluorine-based resins such as polytetrafluoroethylene, polyvinylidene fluoride, polyvinyl fluoride, a tetrafluoroethylene/hexafluoropropylene copolymer, and an ethylene/tetrafluoroethylene copolymer, cellulose esters such as cellulose acetate, cellulose acetate propionate, and cellulose acetate butyrate, polysulfone-based resins such as polysulfone and polyethersulfone, and resins such as polyacrylonitrile, polyimide, and polypropylene. Particularly, a separation membrane made of a fluorine-based resin or a polysulfone-based resin can be suitably used for the hollow-fiber membrane module since the heat resistance, physical strength and chemical durability thereof are high.

In addition, the hollow-fiber membrane may further contain a hydrophilic resin in addition to the fluorine-based resin and the polysulfone-based resin. The hydrophilic resin can improve the hydrophilicity of the hollow-fiber membrane and improve the water permeability of the membrane. The hydrophilic resin may be any resin that can impart hydrophilicity to the separation membrane, and is not limited to a specific compound. For example, cellulose esters, fatty acid vinyl esters, vinyl pyrrolidone, ethylene oxides, propylene oxides, polymethacrylate-based resins and polyacrylate-based resins are preferably used.

In the case of preparing the hollow-fiber membrane module, the potting cap is filled with hollow-fiber membranes and fixed with a potting agent. At this time, the hollow-fiber membranes are dried in advance from the viewpoint of improving the handling and preventing bonding failure. However, since most of the hollow-fiber membranes have a problem of shrinkage due to drying and the water permeability decreases, hollow-fiber membranes obtained by being immersing in an aqueous glycerin solution and then being dried are used. When the hollow-fiber membranes are immersed in the aqueous glycerin solution and then dried, the shrinkage due to the drying can be prevented by the glycerin remaining in the pores, and then the water permeability can be restored by immersion treatment with a solvent such as ethanol.

<Operation Method of Hollow-Fiber Membrane Module>

Next, a filtration method by the hollow-fiber membrane module 100A is described. The raw liquid flows into the hollow-fiber membrane module 100A from the raw liquid inflow port 5 of the case lower cap 2b, and the filtered liquid having passed through the hollow-fiber membranes 1 is discharged to the outside of the hollow-fiber membrane module 100A from the filtered liquid outlet 7 of the case upper cap 2a.

Here, a method in which whole amount of the supplied raw liquid is filtered in a state where the raw liquid outlet 6 of the case side nozzle 2c is closed is referred to as dead-end filtration. On the other hand, a method of performing filtration while discharging the raw liquid by opening the raw liquid outlet 6 of the case side nozzle 2c, that is, a method of filtering while letting the raw liquid flow parallel to membrane surface, is referred to as cross-flow filtration.

The cross-flow filtration has the effect of preventing the accumulation of the suspended solids in the raw liquid on the membrane surface, and the effect of preventing the concentration polarization of the components contained in the raw liquid on the membrane surface, but the power cost is higher than that of the dead-end filtration since the amount of the raw liquid delivered is larger.

In addition, as in the hollow-fiber membrane module 100A of FIG. 1, a method in which the raw liquid is supplied to the outside of the hollow-fiber membranes and the filtration is performed from the outside to the inside is referred to as external pressure filtration. On the contrary, a method of performing filtration from the inside to the outside of the hollow-fiber membranes is referred to as an internal pressure filtration. Since the raw liquid is supplied to the hollow part of the hollow-fiber membranes in the internal pressure filtration, the hollow part may be clogged by the suspended solids so that the liquid cannot be delivered in the case of a raw liquid having a high turbidity. Thus, an external pressure type hollow-fiber membrane module is preferred for filtration of a raw liquid having a high turbidity.

The filtration flux may be set appropriately according to the properties of the raw liquid, and is preferably from 0.1 $m^3/m^2/d$ to 10.0 $m^3/m^2/d$, more preferably from 0.3 $m^3/m^2/d$ to 5.0 m $m^3/m^2/d$, and still more preferably from 0.5 $m^3/m^2/d$ to 3.0 $m^3/m^2/d$.

In the above flushing and cross-flow filtration, the hollow-fiber membrane module is cleaned by supplying the raw liquid from the raw liquid inflow port 5 into the hollow-fiber membrane module and discharging the raw liquid from the raw liquid outlet 6, and the shear stress acting on the membrane surface is improved and the membrane cleaning effect is improved by increasing the membrane surface linear velocity of the raw liquid.

The membrane surface linear velocity (m/s) can be obtained by dividing the raw liquid flow rate ($m^3$/s) by the flow channel area ($m^2$) of the radial cross section of the hollow-fiber membrane module, and in the case where a member such as a flow-regulating cylinder or an inner pipe exists in the hollow-fiber membrane module, the flow channel area changes depending on the part. Therefore, in the present invention, the representative membrane surface linear velocity is defined by the formula (8) based on the inner cross-sectional area T2 of the case and the total cross-sectional area S2 of the cross section of the hollow-fiber membranes.

$$\text{Representative membrane surface linear velocity [m/s]} = [raw\text{ liquid flow rate}]/(T2-S2) \tag{8}$$

The representative membrane surface linear velocity during the flushing is preferably 0.1 m/s or more, more preferably 0.3 m/s or more, and still more preferably 0.5 m/s or more. When the representative membrane surface linear velocity is less than 0.1 m/s, sufficient cleaning effects may not be obtained. In addition, the representative membrane surface linear velocity during the flushing is preferably 5 m/s or less, more preferably 3 m/s or less, and still more preferably 2 m/s or less. When the representative membrane surface linear velocity is more than 5 m/s, the power cost may be increased.

In the dead-end filtration and the cross-flow filtration, filtration may be regularly stopped to perform backwashing. In the backwashing, a backwashing liquid is supplied from the filtered liquid outlet 7 of the hollow-fiber membrane module 100A, and the backwashing liquid flows from the inside to the outside of the hollow-fiber membrane to clean the membrane. When the water permeability is restored by backwashing, the filtration time can be extended, and the operating cost can be reduced since the frequency of chemical cleaning is reduced. The backwashing may be performed with the filtered liquid or other liquids such as water.

The backwashing flux may be appropriately set according to the properties of the raw liquid and the state of clogging of the hollow-fiber membranes, and is preferably from 0.5 $m^3/m^2/d$ to 10.0 $m^3/m^2/d$, and more preferably from 1.0 $m^3/m^2/d$ to 5.0 m $m^3/m^2/d$. When the backwashing flux is less than 0.5 $m^3/m^2/d$, the cleaning effect may be lowered. In addition, when the backwashing flux is more than 10.0 $m^3/m^2/d$, the power cost may be increased, or a large amount of liquid used for backwashing may be required.

Second Embodiment

The configuration of the hollow-fiber membrane module according to the second embodiment of the present invention is described with reference to the drawings.

Figure 6:
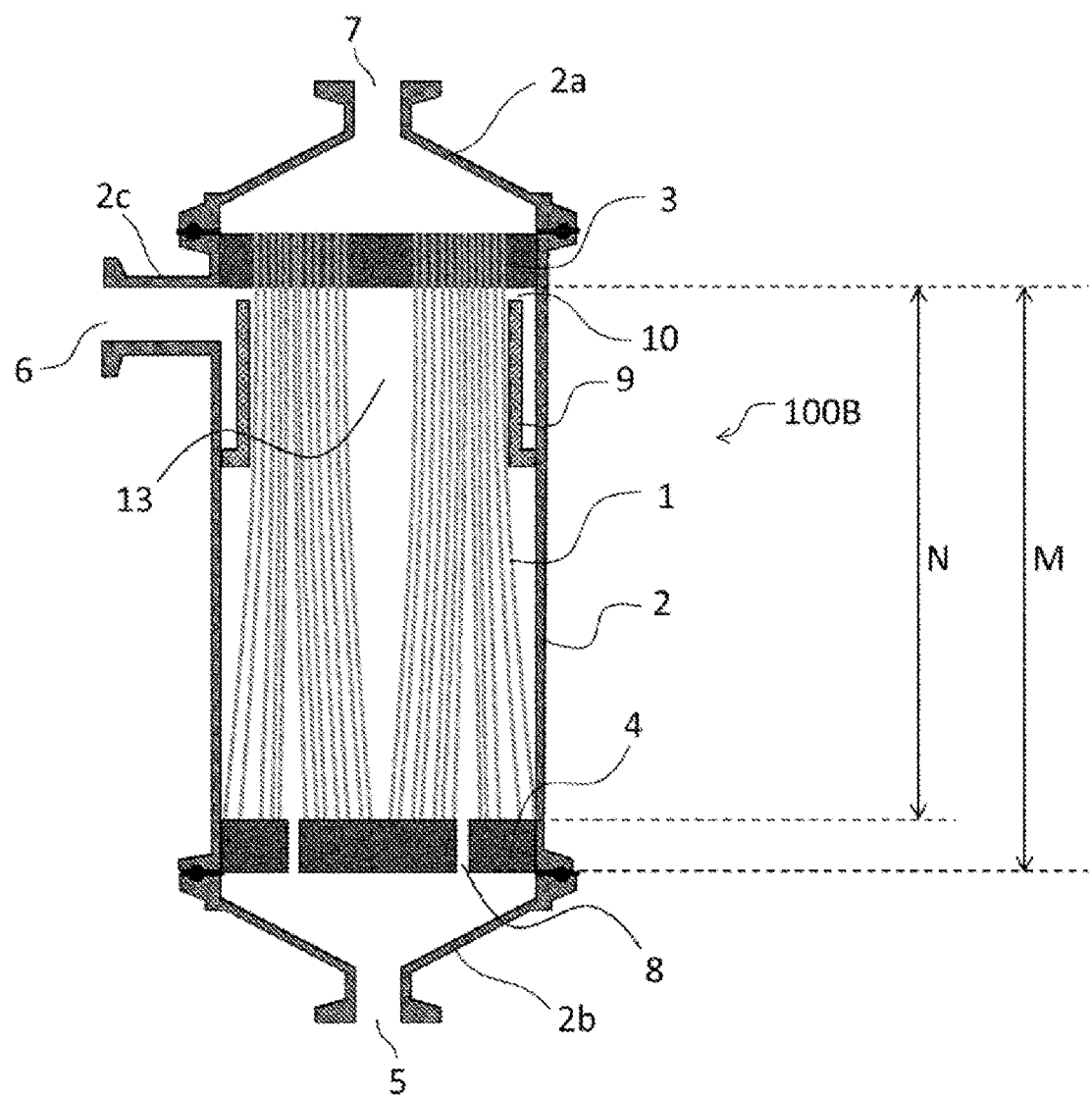
FIG. 6 is a schematic vertical cross-sectional view of a hollow-fiber membrane module according to the second embodiment of the present invention.
Figure 7:
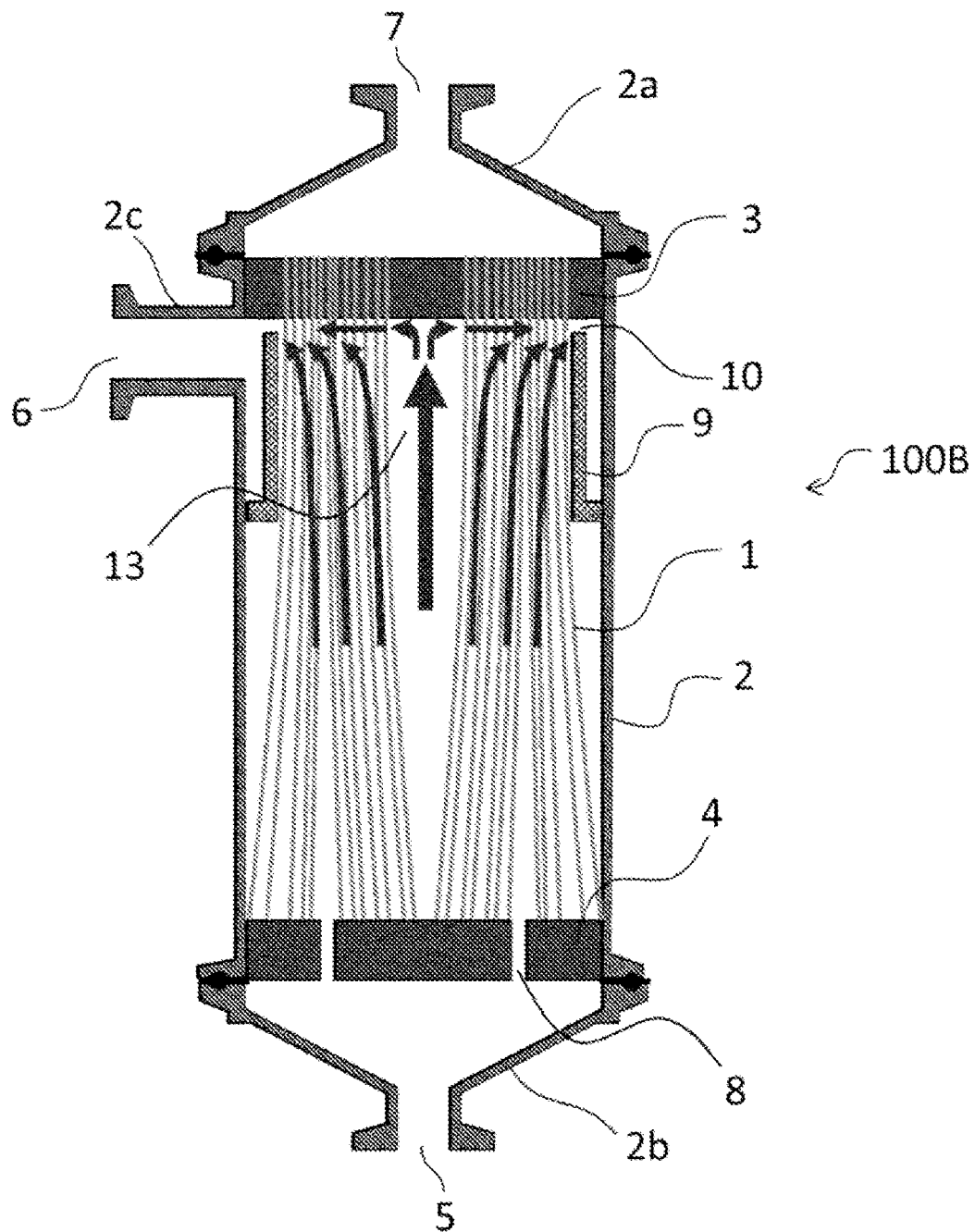
FIG. 7 is a schematic vertical cross-sectional view showing a liquid flow in the hollow-fiber membrane module of FIG. 6.
Figure 8:
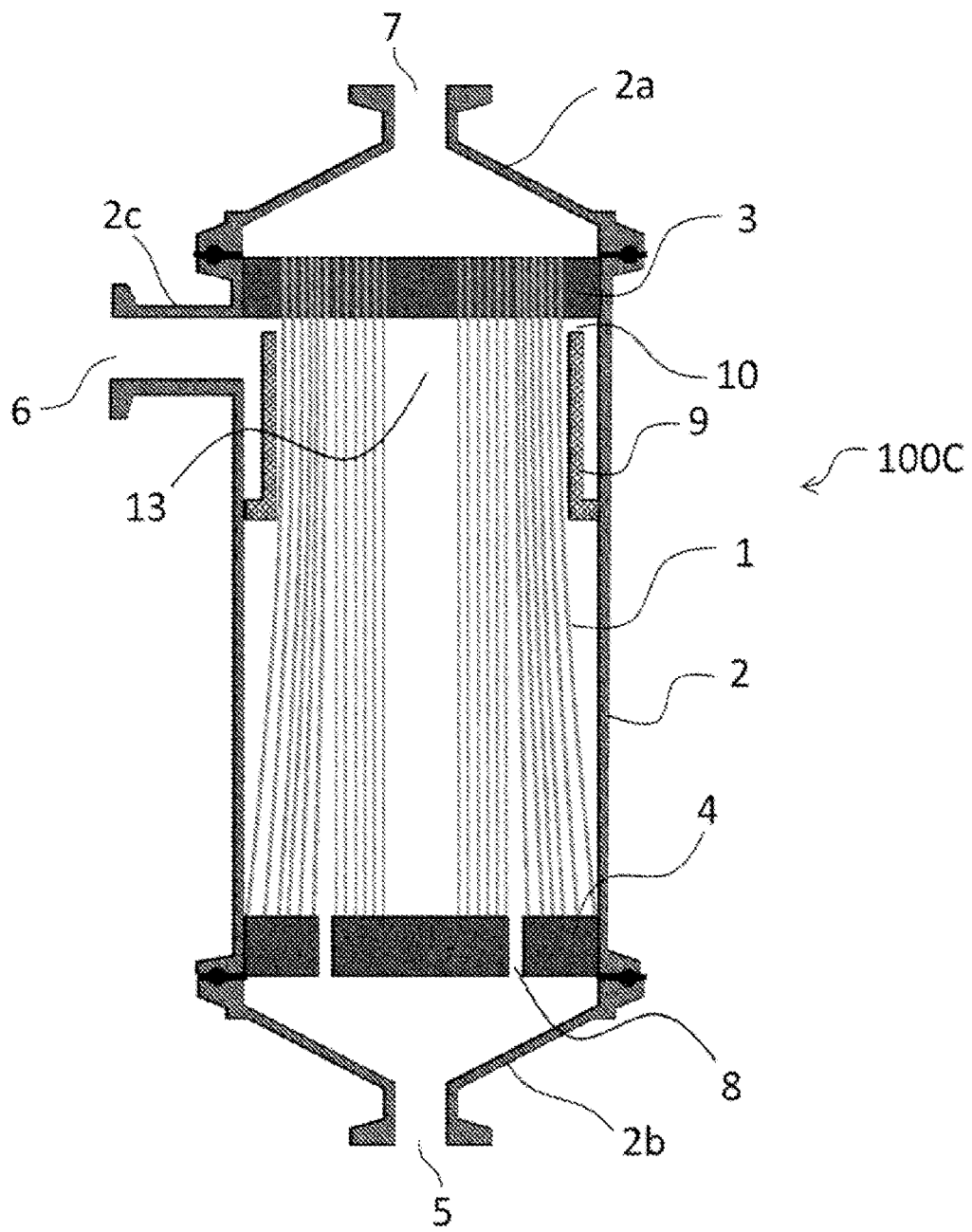
FIG. 8 is a schematic vertical cross-sectional view showing an example of the hollow-fiber membrane module of the present invention.
Figure 9:
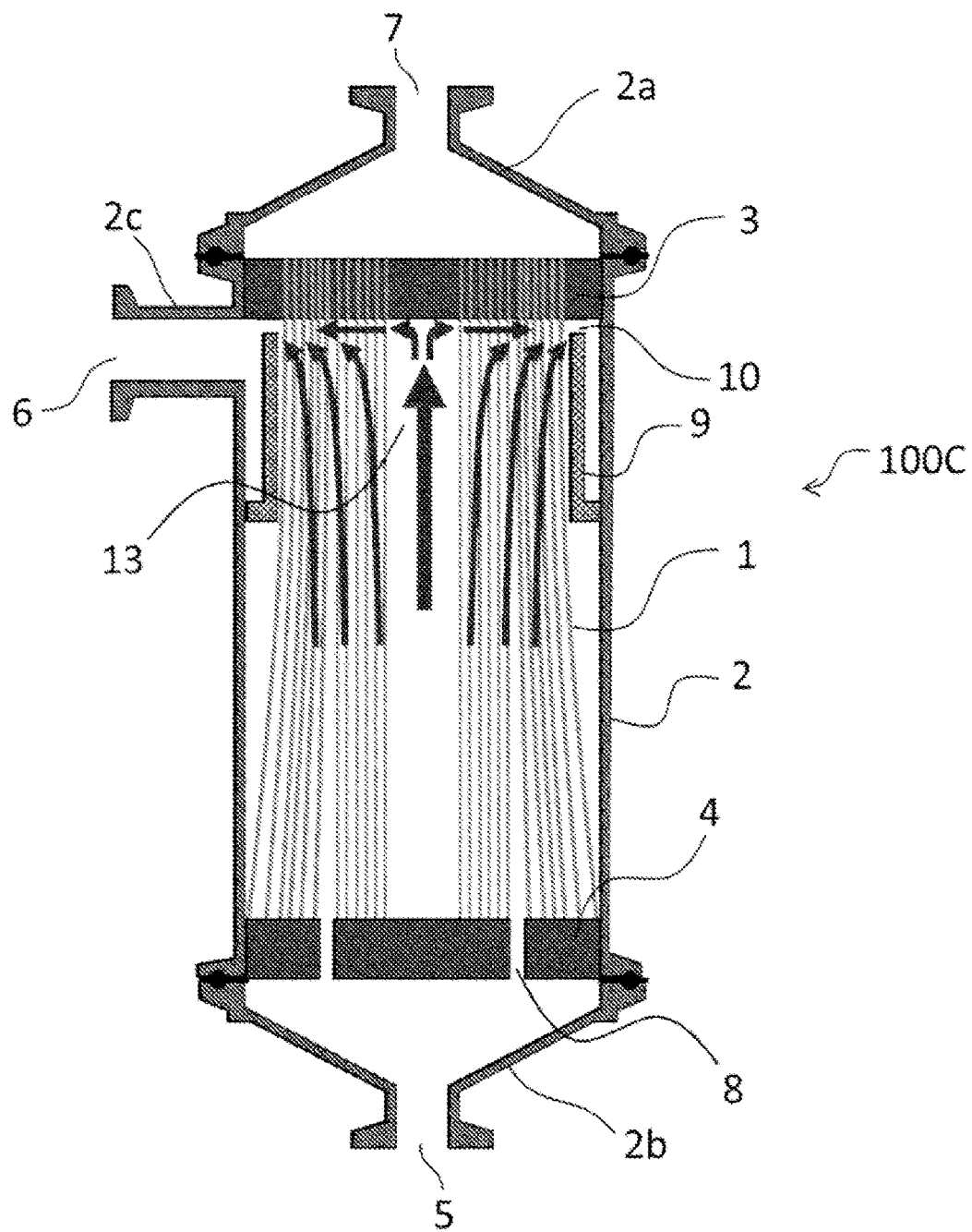
FIG. 9 is a schematic vertical cross-sectional view showing a liquid flow in the hollow-fiber membrane module of FIG. 8.

FIG. 6 is a schematic vertical cross-sectional view of the hollow-fiber membrane module 100B according to the second embodiment of the present invention. FIG. 7 shows the liquid flow in the hollow-fiber membrane module 100B during the flushing. FIG. 8 is a schematic vertical cross-sectional view of a hollow-fiber membrane module 100C according to a variation of the second embodiment of the present invention. FIG. 9 shows the liquid flow in the hollow-fiber membrane module 100C during the flushing.

<Flow-Regulating Structure>

The hollow-fiber membrane module 100B shown in FIG. 6 is provided with a central space part 13 instead of the inner pipe 11 in the first embodiment. The central space part 13 can be formed in a manner where the central part of the hollow-fiber membrane module is divided by a spacer or the like when the hollow-fiber membranes 1 are bonded and fixed in the first potting part 3.

The configuration of the hollow-fiber membrane module according to the second embodiment of the present invention is similar to the configuration of the hollow-fiber membrane module according to the first embodiment of the present invention except that the central space part is provided instead of the inner pipe.

Forming the central space part 13 causes the flow of the raw liquid as shown in FIG. 7 during the flushing. The raw liquid directed from the second end side (lower side) of the module to the first end side (upper side) of the module passes through the central space part 13, is introduced to the module radial center part on the second end side (lower side) of the first potting part 3, and thereafter flows toward the flow-regulating holes 10 of the flow-regulating cylinder 9. With this flow-regulating structure, in the vicinity of the second end side (lower side) of the first potting part 3, a radial flow is generated from the module radial center part to the radially outer peripheral side, and the accumulated suspended solids can be washed away.

<Flow Parameter F>

Here, in order to introduce the raw liquid to the central space part 13 during the flushing, the filling ratio A1 of the hollow-fiber membranes in the central space part 13 needs to be smaller than the filling ratio A2 of the hollow-fiber membranes outside of the central space part 13. This is because the liquid flow resistance is lowered and the flow velocity in the central space part 13 is increased by setting the filling ratio A1 of the hollow-fiber membranes in the central space part 13 smaller than the filling ratio A2 of the hollow-fiber membranes outside of the central space part 13.

Here, the filling ratio of the hollow-fiber membranes refers to the proportion of the area occupied by the hollow-fiber membranes in a cross section (plane parallel to the left-right direction of FIG. 6 and perpendicular to the paper surface) of the case 2 of the hollow-fiber membrane module between the first potting part 3 and the second potting part 4. Defining the cross-sectional area of the hollow-fiber membrane existing section inside the case 2 as S1 and the total cross-sectional area of the cross section of the hollow-fiber membranes as S2, the filling ratio of the hollow-fiber membranes can be represented by the following formula (2).

$$\text{Filling ratio of hollow-fiber membranes [\%]} = S2/S1 \times 100 \qquad (2)$$

Here, the hollow-fiber membrane existing section refers to a section in which the hollow-fiber membranes exist. Examples of a method of dividing the section include a method of dividing by members such as the case 2 and the flow-regulating cylinder 9, and a method of dividing by fixing the hollow-fiber membranes at the potting part as in the hollow-fiber membrane module 100B of FIG. 6. In addition, the section can be divided by bundling the hollow-fiber membranes with a binding member or the like in the case 2.

For example, in the second embodiment of the present invention, in the case where the hollow-fiber membrane does not exist in the central space part 13, the area obtained by subtracting the cross-sectional area of the cross section perpendicular to the axial direction of the central space part 13 from the inner cross-sectional area of the flow-regulating cylinder 9 is the cross-sectional area S1 of the hollow-fiber membrane existing section. The filling ratio of the hollow-fiber membranes in the section in which the hollow-fiber membrane does not exist is 0%.

Here, the total cross-sectional area S2 of the cross section of the hollow-fiber membranes can be represented by the following formula (3). The outside diameters of 10 hollow-fiber membranes in the hollow-fiber membrane existing section are measured in two directions, the longest direction and the short direction, respectively. The average value of the measurement values of a total of 20 points is taken as the outside diameter R of the hollow-fiber membrane. Using the outside diameter R and assuming that the cross section of the hollow-fiber membrane is a perfect circle, the total cross-sectional area S2 of the cross section of the hollow-fiber membrane is calculated by the formula (3). In the case where less than 10 hollow-fiber membranes exist in the hollow-fiber membrane existing section, the outside diameters of all the hollow-fiber membranes existing in the hollow-fiber membrane existing section may be measured so as to calculate the average value thereof.

$$S2 = [\text{circular constant}] \times [\text{outside diameter } R \text{ of hollow-fiber membrane}/2]^2 \times [\text{number of hollow-fiber membranes in hollow-fiber membrane existing section}] \qquad (3)$$

Here, as the filling ratio A1 of the hollow-fiber membranes in the central space part 13 lowers, the liquid flow resistance in the central space part 13 lowers. The filling ratio A1 of the hollow-fiber membranes in the central space part 13 is preferably from 0% to 50%, more preferably from 0% to 40%, and still more preferably from 0% to 30%.

On the other hand, the filling ratio A2 of the hollow-fiber membranes outside of the central space part 13 may be appropriately set in consideration of the balance with the filling ratio A1 of the hollow-fiber membranes in the central space part 13, and is preferably from 20% to 70%, more preferably from 30% to 60%, and still more preferably from 40% to 60%.

In the case of a tapered shape in which the central space part 13 changes the diameter depending on its portion as in the hollow-fiber membrane module 100B of FIG. 6, the filling ratios of the hollow-fiber membranes in the central space part 13 and outside of the central space part 13 are measured at each of the second end side of the first potting part 3 and the first end side of the second potting part 4. Then, the average value of the filling ratios of the hollow-fiber membranes in the central space part 13 at the second end side of the first potting part 3 and the first end side of the second potting part 4 is taken as the filling ratio A1 of the hollow-fiber membranes in the central space part 13. Then, the average value of the filling ratios of the hollow-fiber membranes outside of the central space part 13 at the second end side of the first potting part 3 and the first end side of the second potting part 4 is taken as the filling ratio A2 of the hollow-fiber membranes outside of the central space part 13.

Here, defining the cross-sectional area of the cross section perpendicular to the axial direction of the central space part 13 as T1 and the cross-sectional area (inner cross-sectional area) of the case 2 as T2, the flow parameter F of following formula (1) is preferably from 1.0 to 8.0.

$$F = (A2 - A1) \times T1/T2 \qquad (1)$$

In the formula (1), (A2−A1) is a difference between the filling ratios of the hollow-fiber membranes outside and inside of the central space part 13, and represents a difference in the liquid flow resistance between the outside and the inside of the central space part 13. The larger the (A2−A1), the easier the raw liquid flows to the central space part 13. Meanwhile, T1/T2 represents the proportion of the cross-sectional area of the central space part 13 to the cross-sectional area of the case 2. The larger the T1/T2, the easier the raw liquid flows to the central space part 13.

In order to sufficiently introduce the raw liquid to the central space part 13 and to improve the membrane cleaning effect in the vicinity of the second end side (lower side) of the first potting part 3, the flow parameter F of the formula (1) is preferably from 1.0 to 8.0, and more preferable from 2.0 to 8.0.

When the flow parameter F is less than 1.0, the flow velocity in the central space part 13 may be lowered, and the sufficient membrane cleaning effect may not be obtained in the vicinity of the second end side (lower side) of the first potting part 3. On the other hand, when the flow parameter F is more than 8.0, the flow velocity outside of the central space part 13 may be significantly lowered, and the membrane cleaning effect of the hollow-fiber membranes outside of the central space part 13 may be lowered.

In the case of a tapered shape in which the central space part 13 changes the diameter depending on its portion, the cross-sectional area of the central space part 13 is measured at each of the second end side of the first potting part 3 and the first end side of the second potting part 4. Then, the average value of the cross-sectional areas of the hollow-fiber membranes in the central space part 13 at the second end side of the first potting part 3 and the first end side of the second potting part 4 is taken as the cross-sectional area T1 of the cross section perpendicular to the axial direction of the central space part 13.

In addition, a hollow-fiber membrane module in which the filling ratio of the hollow-fiber membranes is continuously changed from the center to the outer peripheral part of the hollow-fiber membrane module can also be obtained. In this case, a range of 30% of the inside diameter of the case 2 from the central part of the case 2 is defined as a central space part 13.

<Length of Central Space Part>

In the hollow-fiber membrane module 100B of the second embodiment, the length of the central space part 13 (the axial direction of the hollow-fiber membrane module) is preferably equal to or greater than the inside diameter D of the case side nozzle 2c, more preferably 1.5×D or more, and still more preferably 2×D or more. Here, the length of the central space part 13 is a length from the second end side (lower side) of the first potting part 3 to a point where the hollow-fiber membranes 1 are bound or fixed. The hollow-fiber membranes 1 can be bound or fixed by a binding member or the second potting part 4.

When the length of the central space part 13 is less than the inside diameter D of the case side nozzle 2c, the flow from the second end side (lower side) of the module may be dispersed in the radial direction of the module before reaching the central space part 13, and the flow velocity in the central space part 13 may not be sufficiently increased. On the other hand, defining the length from the second end side (lower side) of the first potting part 3 to the second end side (lower side) of the second potting part 4 as M and the length from the second end side (lower side) of the first potting part 3 to the first end side (upper side) of the second potting part 4 as N, the length of the central space part 13 is N or less. Providing the through holes 8 at the center part of the second potting part 4 enables the flow channel to be connected from the through holes 8 to the central space part 13.

Since the difference in liquid flow resistance between the central space part 13 and outside of the central space part 13 is increased when the central space part 13 is long, the flow velocity of the central space part 13 is increased and the membrane cleaning effect in the vicinity of the second end side (lower side) of the first potting part 3 is improved; while on the other hand, since the flow velocity outside of the central space part 13 is lowered, the membrane cleaning effect outside of the central space part 13 may be lowered.

EXAMPLES

The present invention is described below with reference to specific examples, but the present invention is not limited at all by these examples.

Reference Example 1

38 parts by mass of a vinylidene fluoride homopolymer having a weight average molecular weight of 417,000 and 62 parts by mass of γ-butyrolactone were mixed and dissolved at 160° C. to prepare a polymer solution. This polymer solution was discharged from a double tube-type spinneret while causing an aqueous 85 wt % γ-butyrolactone solution to form as a hollow part forming liquid, and the discharged solution was solidified in a cooling bath which contains an aqueous 85 mass % γ-butyrolactone solution at a temperature of 20° C. and was provided 30 mm below the spinneret, to prepare a hollow-fiber membrane having a spherical structure.

Next, 14 parts by mass of a vinylidene fluoride homopolymer having a weight average molecular weight of 284,000, 1 part by mass of cellulose acetate propionate (produced by Eastman Chemical Company, CAP 482-0.5), 77 parts by mass of N-methyl-2-pyrrolidone, 5 parts by mass of polyoxyethylene sorbitan fatty acid ester (produced by Sanyo Chemical Industries, Ltd., "IONET" (registered trademark) T-20C), and 3 parts by mass of water were mixed and dissolved at 95° C., to prepare a polymer solution (membrane-forming solution).

This membrane-forming solution was uniformly coated onto the surface of the hollow-fiber membrane having a spherical structure and was immediately solidified in a water bath, to prepare a hollow-fiber membrane having a three-dimensional mesh structure formed on the spherical structure layer. The obtained hollow-fiber membrane had an outside diameter of 1350 μm, an inside diameter of 800 μm, and a membrane surface average pore size of 40 nm.

Example 1

(Preparation of Hollow-Fiber Membrane Module)

The hollow-fiber membrane of Reference Example 1 was immersed in an aqueous 30 mass % glycerin solution for 1 hour, and then air-dried. The hollow part of the hollow-fiber membrane was sealed with a silicone adhesive (produced by Dow Corning Toray Co., Ltd., SH850A/B, a mixture of two components mixed to afford a mass ratio of 50:50) at one end.

Among surfaces of a case 2 made of a vinyl chloride resin (inside diameter: 77 mm, flow-regulating cylinder outer peripheral part inside diameter: 90 mm, length: 1900 mm, case side nozzle inside diameter: 24 mm), a flow-regulating cylinder 9 (outside diameter: 75 mm, inside diameter: 71 mm), and an inner pipe 11 (outside diameter: 24 mm, inside diameter: 20 mm), regions to be bonded with a potting agent were preliminarily filed with sandpaper (#80) and degreased with ethanol.

Thereafter, as shown in FIG. 12, a bundle of the above hollow-fiber membranes was packed inside of the case 2 and the flow-regulating cylinder 9. At this time, the filling ratio A1 of the hollow-fiber membranes inside of the inner pipe 11 was 0%, and the filling ratio A2 of the hollow-fiber membranes outside of the inner pipe 11 was 50%.

The hollow-fiber membrane bundle was disposed such that the end part on the sealed side was located in a first end part (right-side end part of FIG. 12) of the case 2, which is the module upper part side, and a first potting cap 15 was further fixed. A second potting cap 16 having 36 holes in the bottom thereof was fixed to a second end part (left-side end part of FIG. 12), which is the module lower part side.

Then, 36 pins 14 were inserted into the holes in the bottom of the second potting cap 16 and fixed. The positions of the pins 14 were disposed in the same manner as the through holes in FIG. 5. The module having potting caps thus-fixed to both ends was installed in a centrifugal molding machine.

A polymeric MDI (produced Huntsman Japan Co., Ltd., Suprasec 5025), a polybutadiene-based polyol (produced by Cray Valley, Krasol LBH 3000), and 2-ethyl-1,3-hexanediol were mixed to afford a mass ratio of 57:100:26. The obtained mixture (i.e., polyurethane resin liquid) was put in a potting agent charging fixture 17.

Subsequently, the centrifugal molding machine was rotated, and the potting caps at both ends were filled with the potting agent to form a first potting part 3 and a second potting part 4. The potting agent charging fixture 17 was split in two directions, and by means of the centrifugal force, the polyurethane resin liquid was charged into the module upper part side (first end part) and into the module lower part side (second end part). The temperature in the centrifugal molding machine was 35° C., and the centrifugation time was 4 hours.

After the centrifugation, the first potting cap 15, the second potting cap 16 and the pins 14 were removed, and the potting agent was post-cured for further 24 hours at room temperature. Thereafter, the outer potting agent portion (C-C plane shown in FIG. 14) on the module upper part side (first end part side) of the case 2 was cut with a chip saw-type rotary blade to open the end face of the hollow-fiber membrane. A case upper cap 2a and a case lower cap 2b were then fixed to both ends of the case 2 to obtain a hollow-fiber membrane module 100F shown in FIG. 16.

Ethanol was then delivered to the hollow-fiber membrane module 100F and filtered to fill the pores of the hollow-fiber membrane with ethanol. Subsequently, RO (Reverse Osmosis) water was delivered and filtered to replace ethanol with RO water. The length from the second end side of the first potting part 3 to the first end side of the second potting part 4 was 1776 mm.

The length of the inner pipe 11 of the hollow-fiber membrane module 100F was 12 mm. In addition, at positions where the inner pipe 11 was in contact with the second end side of the first potting part 3, four first side opening parts each having a height of 12 mm and a width of 14.8 mm (rectangle) were uniformly disposed in the circumferential direction. Further, at positions where the flow-regulating cylinder 9 was in contact with the second end side of the first potting part 3, 12 first flow-regulating holes each having a height of 10 mm and a width of 8 mm (rectangle) were uniformly disposed in the circumferential direction. The width of the flow channel between the flow-regulating cylinder 9 and the case 2 was 7.5 mm, and the axial height was 50 mm.

In the hollow-fiber membrane module 100F, the flow parameter F was calculated according to the above formula (1), the proportion R1 of the total opening area occupied by the first side opening parts was calculated according to the above formula (4), the proportion R2 of the total opening area of the first side opening parts of the inner pipe 11 to the inner cross-sectional area T2 of the case 2 was calculated according to the above formula (5), the proportion R3 of the total opening area of the flow-regulating holes to the inner cross-sectional area T2 of the case 2 was calculated according to the above formula (6), and the proportion R4 of the total opening area occupied by the first flow-regulating holes among the total opening area of the flow-regulating holes 10 was calculated according to the above formula (7). The results are shown in Table 1.

(Clarification Property Evaluation)

The clarification property of the hollow-fiber membrane module 100F was evaluated by the following method.

A suspension of 70 mg/L bentonite and 70 mg/L polyaluminum chloride and having a pH of 7 was prepared and stirred for 1 hour or more to form aggregation flocs. The supplied suspension was filtered for 30 minutes at a filtration flux of 1 m$^3$/m$^2$/d. Subsequently, backwashing with the filtered liquid was performed. The backwashing flux was performed for 1 minute at 2 m$^3$/m$^2$/d. Subsequently, using the supplied suspension, flushing was performed for 1 minute at a representative membrane surface linear velocity of 0.4 m/s. The discharged liquid discharged to the outside of the hollow-fiber membrane module by the backwashing and flushing was recovered, the amount of suspended solids was measured, and the clarification rate by cleaning was calculated according to formula (9).

Clarification rate [%]=[mass of discharged suspended solids]/[mass of supplied suspended solids]×100 (9)

The mass of the discharged suspended solids and the mass of the supplied suspended solids were obtained by the following method.

1 L of the suspension was filtered through a glass filter with a pore size of 1 μm and dried at 110° C. for 3 hours, and then the mass thereof was measured. The suspended solids mass per liter of the suspension was measured by subtracting the mass of the glass filter paper measured preliminarily, and the concentration of the suspended solids (g/L) was obtained.

The mass of the supplied suspended solids was obtained by multiplying the concentration of the suspended solids in the supplied suspension by the supplied liquid amount (the sum of the amount of the filtered liquid and the amount of the flushing liquid), as shown in the formula (10).

The mass of the discharged suspended solids was obtained by multiplying the concentration of the suspended solids in the discharged liquid discharged to the outside by cleaning by the amount of the discharged liquid (the sum of the amount of the backwashing liquid and the amount of the flushing liquid), as shown in formula (11).

Mass of supplied suspended solids [g]=[concentration of suspended solids in supplied suspension]×[amount of filtered liquid+amount of flushing liquid] (10)

Mass of discharged suspended solids [g]=[concentration of suspended solids in discharged liquid]×[amount of backwashing liquid+amount of flushing liquid] (11)

As a result of evaluating the clarification rate of the hollow-fiber membrane module 100F by the above method, the clarification rate was 90%.

Examples 2 to 8

A hollow-fiber membrane module 100F was prepared in the same manner as in Example 1 except that the length of the inner pipe 11 was changed to that shown in Table 1.

The evaluation results of the clarification rate of each hollow-fiber membrane module 100F are shown in Table 1.

The flow parameter F, the proportion R1, the proportion R2, the proportion R3 and the proportion R4 were calculated. The results are shown in Table 1.

The relationship between the length of the inner pipe 11 and the clarification rate was as shown in Table 1. D: 98% in Example 2, 1.5×D: 99.5% in Example 3, 2×D: 99.5% in Example 4, 3×D: 99.5% in Example 5, 5×D: 99% in Example 6, 40×D: 96% in Example 7, and 60×D: 94% in Example 8.

D in Table 1 indicates the inside diameter of the case side nozzle.

Example 9

A hollow-fiber membrane module 100F was prepared in the same manner as in Example 1 except that the length of the inner pipe 11 was 72 mm (3×D) and the filling ratio A1 of the hollow-fiber membranes inside of the inner pipe 11 was 10%. As a result of evaluating the clarification rate of the hollow-fiber membrane module 100F by the above method, the clarification rate was 98%.

The flow parameter F, the proportion R1, the proportion R2, the proportion R3 and the proportion R4 were calculated. The results are shown in Table 1.

Example 10

A hollow-fiber membrane module 100F was prepared in the same manner as in Example 9 except that the filling ratio A1 of the hollow-fiber membranes inside of the inner pipe 11 was 20%. As a result of evaluating the clarification rate of the hollow-fiber membrane module 100F by the above method, the clarification rate was 98%.

The flow parameter F, the proportion R1, the proportion R2, the proportion R3 and the proportion R4 were calculated. The results are shown in Table 1.

Example 11

A hollow-fiber membrane module 100F was prepared in the same manner as in Example 9 except that the filling ratio A1 of the hollow-fiber membranes inside of the inner pipe 11 was 30%. As a result of evaluating the clarification rate of the hollow-fiber membrane module 100F by the above method, the clarification rate was 96%.

The flow parameter F, the proportion R1, the proportion R2, the proportion R3 and the proportion R4 were calculated. The results are shown in Table 1.

Example 12

A hollow-fiber membrane module 100F was prepared in the same manner as in Example 1 except that the length of the inner pipe 11 was 72 mm (3×D), the inside diameter thereof was 12 mm, the outside diameter thereof was 16 mm, and the width of the first side opening part was 8.6 mm. As a result of evaluating the clarification rate of the hollow-fiber membrane module 100F by the above method, the clarification rate was 96%.

The flow parameter F, the proportion R1, the proportion R2, the proportion R3 and the proportion R4 were calculated. The results are shown in Table 1.

Example 13

A hollow-fiber membrane module 100F was prepared in the same manner as in Example 1 except that the length of the inner pipe 11 was 72 mm (3×D), the inside diameter thereof was 28 mm, the outside diameter thereof was 32 mm, the width of the first side opening part was 21.1 mm, and the filling ratio A2 of the hollow-fiber membranes outside of the inner pipe 11 was 60%. As a result of evaluating the clarification rate of the hollow-fiber membrane module 100F by the above method, the clarification rate was 99%.

The flow parameter F, the proportion R1, the proportion R2, the proportion R3 and the proportion R4 were calculated. The results are shown in Table 1.

Example 14

The length of the inner pipe 11 was 72 mm (3×D), and at positions where the inner pipe 11 was in contact with the second end side of the first potting part 3, four first side opening parts each having a height of 12 mm and a width of 14.8 mm (rectangle) were uniformly disposed in the circumferential direction. Further, four side opening parts 12 each having a height of 3 mm and a width of 14.8 mm (rectangle) were uniformly disposed in the circumferential direction in the range of 5 mm to 8 mm from the second end side to the first end side of the inner pipe 11. A hollow-fiber membrane module 100F was prepared in the same manner as in Example 1 except for the above. As a result of evaluating the clarification rate of the hollow-fiber membrane module 100F by the above method, the clarification rate was 98%.

The flow parameter F, the proportion R1, the proportion R2, the proportion R3 and the proportion R4 were calculated. The results are shown in Table 1.

Example 15

The length of the inner pipe 11 was 72 mm (3×D), and at positions where the inner pipe 11 was in contact with the second end side of the first potting part 3, four first side opening parts each having a height of 12 mm and a width of 14.8 mm (rectangle) were uniformly disposed in the circumferential direction. Further, four side opening parts 12 having a height of 12 mm and a width of 14.8 mm (rectangle) were uniformly disposed in the circumferential direction in the range of 5 mm to 17 mm from the second end side to the first end side of the inner pipe 11. A hollow-fiber membrane module 100F was prepared in the same manner as in Example 1 except for the above. As a result of evaluating the clarification rate of the hollow-fiber membrane module 100F by the above method, the clarification rate was 97%.

The flow parameter F, the proportion R1, the proportion R2, the proportion R3 and the proportion R4 were calculated. The results are shown in Table 1.

Example 16

The length of the inner pipe 11 was 72 mm (3×D), and at positions where the inner pipe 11 was in contact with the second end side of the first potting part 3, four first side opening parts each having a height of 12 mm and a width of 14.8 mm (rectangle) were uniformly disposed in the circumferential direction. Further, four side opening parts 12 each having a height of 12 mm and a width of 14.8 mm (rectangle) were uniformly disposed in the circumferential direction in the range of 5 mm to 17 mm from the second end side to the first end side of the inner pipe 11, and four side opening parts 12 each having a height of 12 mm and a width of 14.8 mm (rectangle) were uniformly disposed in the circumferential direction in the range of 25 mm to 37 mm from the second end side to the first end side of the inner pipe 11. A hollow-fiber membrane module 100F was prepared in the same manner as in Example 1 except for the above. As a result of evaluating the clarification rate of the hollow-fiber membrane module 100F by the above method, the clarification rate was 94%.

The flow parameter F, the proportion R1, the proportion R2, the proportion R3 and the proportion R4 were calculated. The results are shown in Table 1.

Example 17

A hollow-fiber membrane module 100F was prepared in the same manner as in Example 1 except that the length of the inner pipe 11 was 72 mm (3×D), and the height of the first side opening part was 24 mm. As a result of evaluating the clarification rate of the hollow-fiber membrane module 100F by the above method, the clarification rate was 99%.

The flow parameter F, the proportion R1, the proportion R2, the proportion R3 and the proportion R4 were calculated. The results are shown in Table 1.

Example 18

A hollow-fiber membrane module 100F was prepared in the same manner as in Example 1 except that the length of the inner pipe 11 was 72 mm (3×D), and the height of the first side opening part was 4 mm. As a result of evaluating the clarification rate of the hollow-fiber membrane module 100F by the above method, the clarification rate was 99%.

The flow parameter F, the proportion R1, the proportion R2, the proportion R3 and the proportion R4 were calculated. The results are shown in Table 1.

Example 19

The length of the inner pipe 11 was 72 mm (3×D). Further, at positions where the flow-regulating cylinder 9 was in contact with the second end side of the first potting part 3, 12 first flow-regulating holes each having a height of 10 mm and a width of 8 mm (rectangle) were uniformly disposed in the circumferential direction. Further, 12 flow-regulating holes 10 each having a height of 8 mm and a width of 12 mm (rectangle) were uniformly disposed in the circumferential direction in the range of 28 mm to 36 mm from the second end side of the first potting part 3 to the second end side of the hollow-fiber membrane module, and 12 flow-regulating holes 10 each having a height of 8 mm and a width of 12 mm (rectangle) were uniformly disposed in the circumferential direction in the range of 40 mm to 48 mm from the second end side of the first potting part 3 to the second end side of the hollow-fiber membrane module. A hollow-fiber membrane module 100F was prepared in the same manner as in Example 1 except for the above. As a result of evaluating the clarification rate of the hollow-fiber membrane module 100F by the above method, the clarification rate was 94%.

The flow parameter F, the proportion R1, the proportion R2, the proportion R3 and the proportion R4 were calculated. The results are shown in Table 1.

Example 20

The length of the inner pipe 11 was 72 mm (3×D). In addition, 12 first flow-regulating holes each having a height of 8 mm and a width of 10 mm (rectangle) were uniformly disposed in the circumferential direction at positions where the flow-regulating cylinder 9 was in contact with the second end side of the first potting part 3, and further 12 first flow-regulating holes each having a height of 8 mm and a width of 10 mm (rectangle) were uniformly disposed in the circumferential direction in the range of 12 mm to 20 mm from the second end side of the first potting part 3 to the second end side of the hollow-fiber membrane module. A hollow-fiber membrane module 100F was prepared in the same manner as in Example 1 except for the above. As a result of evaluating the clarification rate of the hollow-fiber membrane module 100F by the above method, the clarification rate was 97%.

The flow parameter F, the proportion R1, the proportion R2, the proportion R3 and the proportion R4 were calculated. The results are shown in Table 1.

Example 21

The length of the inner pipe 11 was 72 mm (3×D). Further, at positions where the flow-regulating cylinder 9 was in contact with the second end side of the first potting part 3, 12 first flow-regulating holes each having a height of 6 mm and a width of 6 mm (rectangle) were uniformly disposed in the circumferential direction. A hollow-fiber membrane module 100F was prepared in the same manner as in Example 1 except for the above. As a result of evaluating the clarification rate of the hollow-fiber membrane module 100F by the above method, the clarification rate was 98%.

The flow parameter F, the proportion R1, the proportion R2, the proportion R3 and the proportion R4 were calculated. The results are shown in Table 1.

Example 22

The length of the inner pipe 11 was 72 mm (3×D). Further, at positions where the flow-regulating cylinder 9 was in contact with the second end side of the first potting part 3, 12 first flow-regulating holes each having a height of 5 mm and a width of 8 mm (rectangle) were uniformly disposed in the circumferential direction. Further, 12 flow-regulating holes 10 each having a height of 5 mm and a width of 8 mm (rectangle) were uniformly disposed in the circumferential direction in the range of 30 mm to 35 mm from the second end side of the first potting part 3 to the second end side of the hollow-fiber membrane module. A hollow-fiber membrane module 100F was prepared in the same manner as in Example 1 except for the above. As a result of evaluating the clarification rate of the hollow-fiber membrane module 100F by the above method, the clarification rate was 98%.

The flow parameter F, the proportion R1, the proportion R2, the proportion R3 and the proportion R4 were calculated. The results are shown in Table 1.

Example 23

The length of the inner pipe 11 was 72 mm (3×D). Further, at positions where the flow-regulating cylinder 9 was in contact with the second end side of the first potting part 3, 12 first flow-regulating holes each having a height of 5 mm and a width of 5 mm (rectangle) were uniformly disposed in the circumferential direction. Further, 12 flow-regulating holes 10 each having a height of 5 mm and a width of 5 mm (rectangle) were uniformly disposed in the circumferential direction in the range of 30 mm to 35 mm from the second end side of the first potting part 3 to the second end side of the hollow-fiber membrane module, and further 12 flow-regulating holes 10 each having a height of 5 mm and a width of 5 mm (rectangle) were uniformly disposed in the circumferential direction in the range of 40 mm to 45 mm from the second end side of the first potting part 3 to the second end side of the hollow-fiber membrane module. A hollow-fiber membrane module 100F was prepared in the same manner as in Example 1 except for the above. As a result of evaluating the clarification rate of the hollow-fiber membrane module 100F by the above method, the clarification rate was 94%.

The flow parameter F, the proportion R1, the proportion R2, the proportion R3 and the proportion R4 were calculated. The results are shown in Table 1.

Example 24

Figure 17:
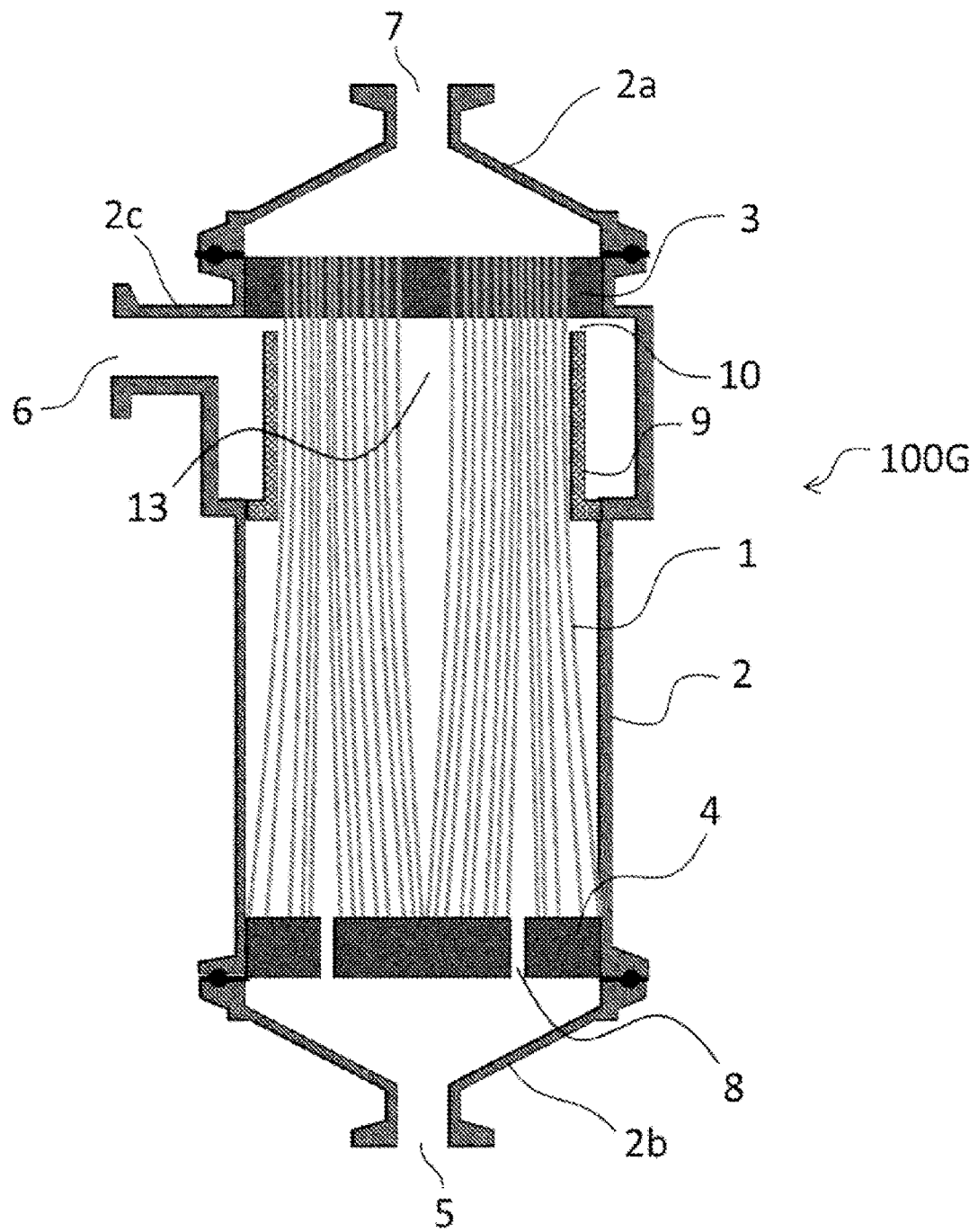
FIG. 17 is a schematic vertical cross-sectional view showing an example of the hollow-fiber membrane module of the present invention.

A hollow-fiber membrane module 100G (FIG. 17) was prepared, which was provided with the central space part 13 having a length N (74×D) from the second end side (lower side) of the first potting part 3 to the first end side (upper side) of the second potting part 4, instead of the inner pipe 11. The central space part 13 had a conical shape decreasing in diameter to the second end side of the hollow-fiber membrane module, the diameter of the central space part 13 at the second end side of the first potting part 3 was 20 mm, and the hollow-fiber membranes 1 were disposed substantially uniformly without providing the central space part 13 on the first end side of the second potting part 4. In addition, the filling ratio A1 of the hollow-fiber membranes in the central space part 13 was 0%, and the filling ratio A2 of the hollow-fiber membranes outside of the central space part 13 was 35%. A hollow-fiber membrane module 100G was prepared in the same manner as in Example 1 except for the above. As a result of evaluating the clarification rate of the hollow-fiber membrane module 100G by the above method, the clarification rate was 94%.

The flow parameter F, the proportion R3 and the proportion R4 were calculated. The results are shown in Table 2.

Example 25

A hollow-fiber membrane module 100G was prepared in the same manner as in Example 24 except that the filling ratio A2 of the hollow-fiber membranes outside of the central space part 13 was 50%. As a result of evaluating the clarification rate of the hollow-fiber membrane module 100G by the above method, the clarification rate was 91%.

The flow parameter F, the proportion R3 and the proportion R4 were calculated. The results are shown in Table 2.

Example 26

At positions where the flow-regulating cylinder 9 was in contact with the second end side of the first potting part 3, 12 first flow-regulating holes each having a height of 8 mm and a width of 8 mm (rectangle) were uniformly disposed in the circumferential direction. Further, 12 flow-regulating holes 10 each having a height of 4 mm and a width of 4 mm (rectangle) were uniformly disposed in the circumferential direction in the range of 30 mm to 34 mm from the second end side of the first potting part 3 to the second end side of the hollow-fiber membrane module. A hollow-fiber membrane module 100G was prepared in the same manner as in Example 25 except for the above. As a result of evaluating the clarification rate of the hollow-fiber membrane module 100G by the above method, the clarification rate was 90%.

The flow parameter F, the proportion R3 and the proportion R4 were calculated. The results are shown in Table 2.

Example 27

At positions where the flow-regulating cylinder 9 was in contact with the second end side of the first potting part 3, 12 first flow-regulating holes each having a height of 5 mm and a width of 5 mm (rectangle) were uniformly disposed in the circumferential direction. Further, 12 flow-regulating holes 10 each having a height of 5 mm and a width of 5 mm (rectangle) were uniformly disposed in the circumferential direction in the range of 30 mm to 35 mm from the second end side of the first potting part 3 to the second end side of the hollow-fiber membrane module, and 12 flow-regulating holes 10 each having a height of 5 mm and a width of 5 mm (rectangle) were uniformly disposed in the circumferential direction in the range of 40 mm to 45 mm from the second end side of the first potting part 3 to the second end side of the hollow-fiber membrane module. A hollow-fiber membrane module 100G was prepared in the same manner as in Example 25 except for the above. As a result of evaluating the clarification rate of the hollow-fiber membrane module 100G by the above method, the clarification rate was 86%.

The flow parameter F, the proportion R3 and the proportion R4 were calculated. The results are shown in Table 2.

Example 28

Figure 18:
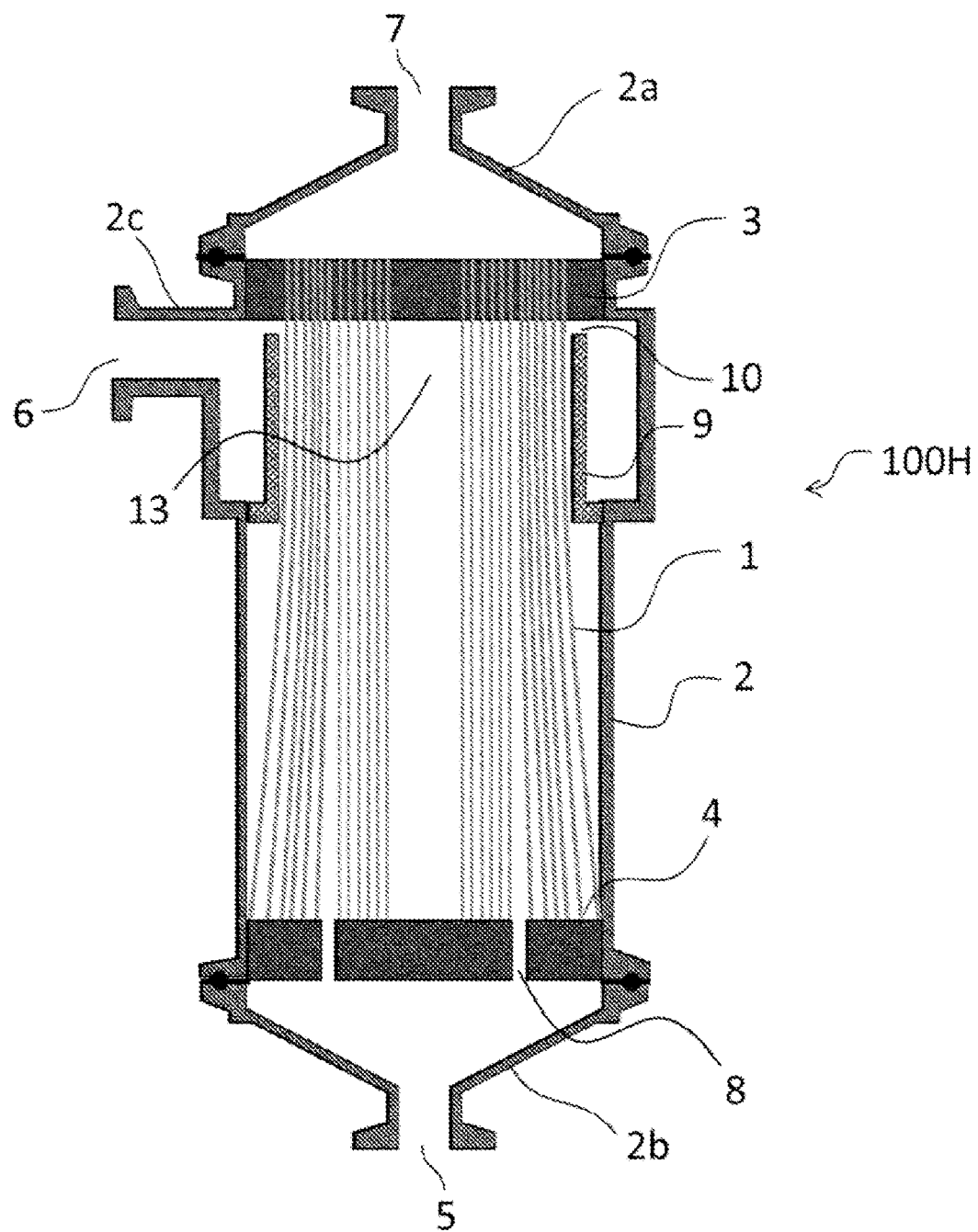
FIG. 18 is a schematic vertical cross-sectional view showing an example of the hollow-fiber membrane module of the present invention.

A hollow-fiber membrane module 100H (FIG. 18) provided with a cylindrical central space part 13 was prepared. The diameter of the central space part 13 at the second end side of the first potting part 3 was 20 mm, and the diameter of the central space part 13 at the first end side of the second potting part 4 was 20 mm. A hollow-fiber membrane module 100H was prepared in the same manner as in Example 24 except for the above. As a result of evaluating the clarification rate of the hollow-fiber membrane module 100H by the above method, the clarification rate was 94%.

The flow parameter F, the proportion R3 and the proportion R4 were calculated. The results are shown in Table 2.

Example 29

A hollow-fiber membrane module 100H was prepared in the same manner as in Example 28 except that the filling ratio A2 of the hollow-fiber membranes outside of the central space part 13 was 50%. As a result of evaluating the clarification rate of the hollow-fiber membrane module 100H by the above method, the clarification rate was 92%.

The flow parameter F, the proportion R3 and the proportion R4 were calculated. The results are shown in Table 2.

Example 30

At positions where the flow-regulating cylinder 9 was in contact with the second end side of the first potting part 3, 12 first flow-regulating holes each having a height of 8 mm and a width of 8 mm (rectangle) were uniformly disposed in the circumferential direction. Further, 12 flow-regulating holes 10 each having a height of 4 mm and a width of 4 mm (rectangle) were uniformly disposed in the circumferential direction in the range of 30 mm to 34 mm from the second end side of the first potting part 3 to the second end side of the hollow-fiber membrane module. A hollow-fiber membrane module 100H was prepared in the same manner as in Example 29 except for the above. As a result of evaluating the clarification rate of the hollow-fiber membrane module 100H by the above method, the clarification rate was 90%.

The flow parameter F, the proportion R3 and the proportion R4 were calculated. The results are shown in Table 2.

Example 31

At positions where the flow-regulating cylinder 9 was in contact with the second end side of the first potting part 3, 12 first flow-regulating holes each having a height of 5 mm and a width of 5 mm (rectangle) were uniformly disposed in the circumferential direction. Further, 12 flow-regulating holes 10 each having a height of 5 mm and a width of 5 mm (rectangle) were uniformly disposed in the circumferential direction in the range of 30 mm to 35 mm from the second end side of the first potting part 3 to the second end side of the hollow-fiber membrane module, and 12 flow-regulating holes 10 each having a height of 5 mm and a width of 5 mm (rectangle) were uniformly disposed in the circumferential direction in the range of 40 mm to 45 mm from the second end side of the first potting part 3 to the second end side of the hollow-fiber membrane module. A hollow-fiber membrane module 100H was prepared in the same manner as in Example 29 except for the above. As a result of evaluating the clarification rate of the hollow-fiber membrane module 100H by the above method, the clarification rate was 87%.

The flow parameter F, the proportion R3 and the proportion R4 were calculated. The results are shown in Table 2.

Comparative Example 1

Figure 19:
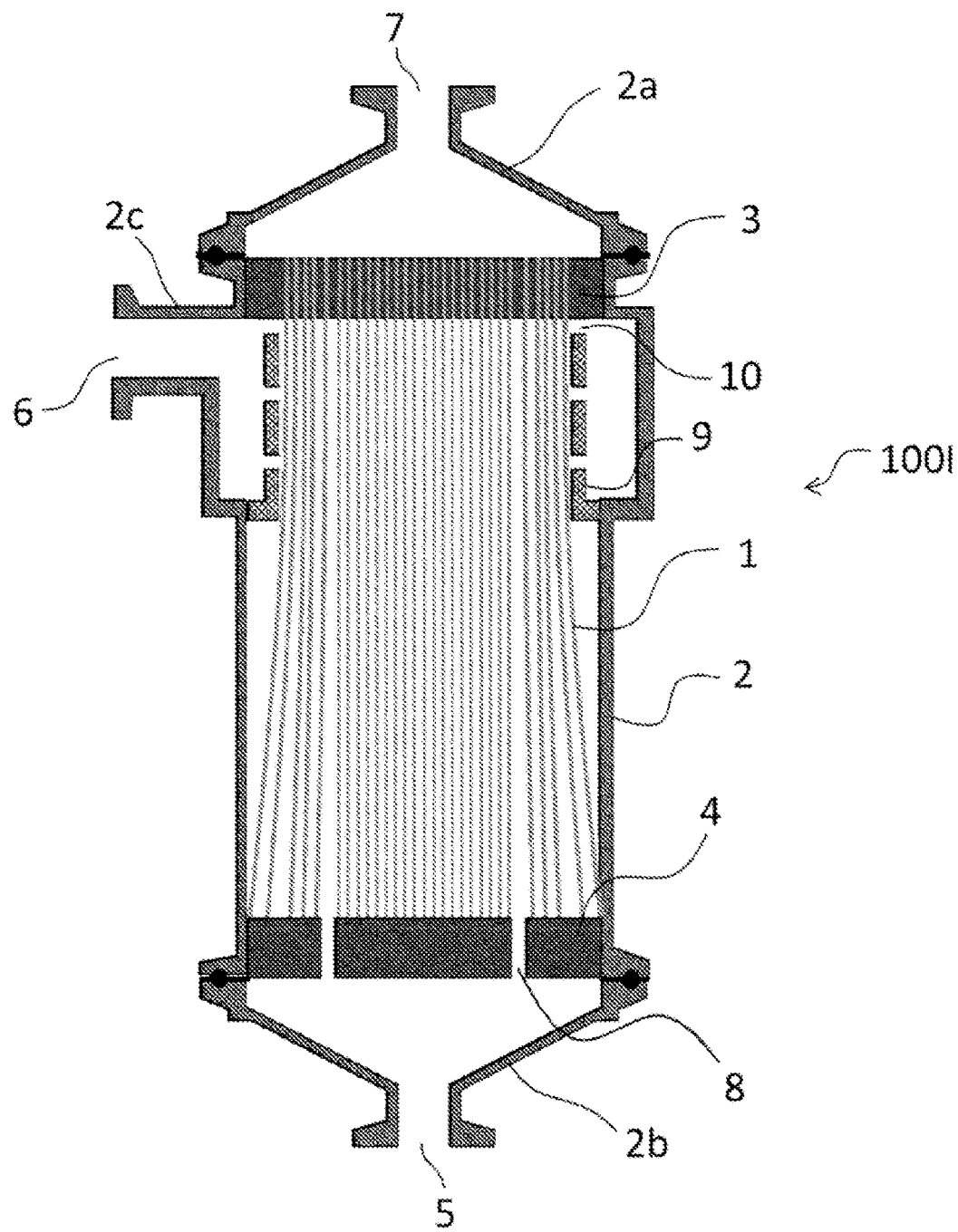
FIG. 19 is a schematic vertical cross-sectional view showing an example of a hollow-fiber membrane module in the related art.

A hollow-fiber membrane module 100I shown in FIG. 19 was prepared. The inner pipe and the central space part were not provided, and the filling ratio of the hollow-fiber membranes inside of the flow-regulating cylinder 9 was 50%. The hollow-fiber membrane module 100I was prepared in the same manner as in Example 31 except for the above. As a result of evaluating the clarification rate of the hollow-fiber membrane module 100I by the above method, the clarification rate was 78%.

The proportion R3 and the proportion R4 were calculated. The results are shown in Table 2.

Comparative Example 2

Figure 20:
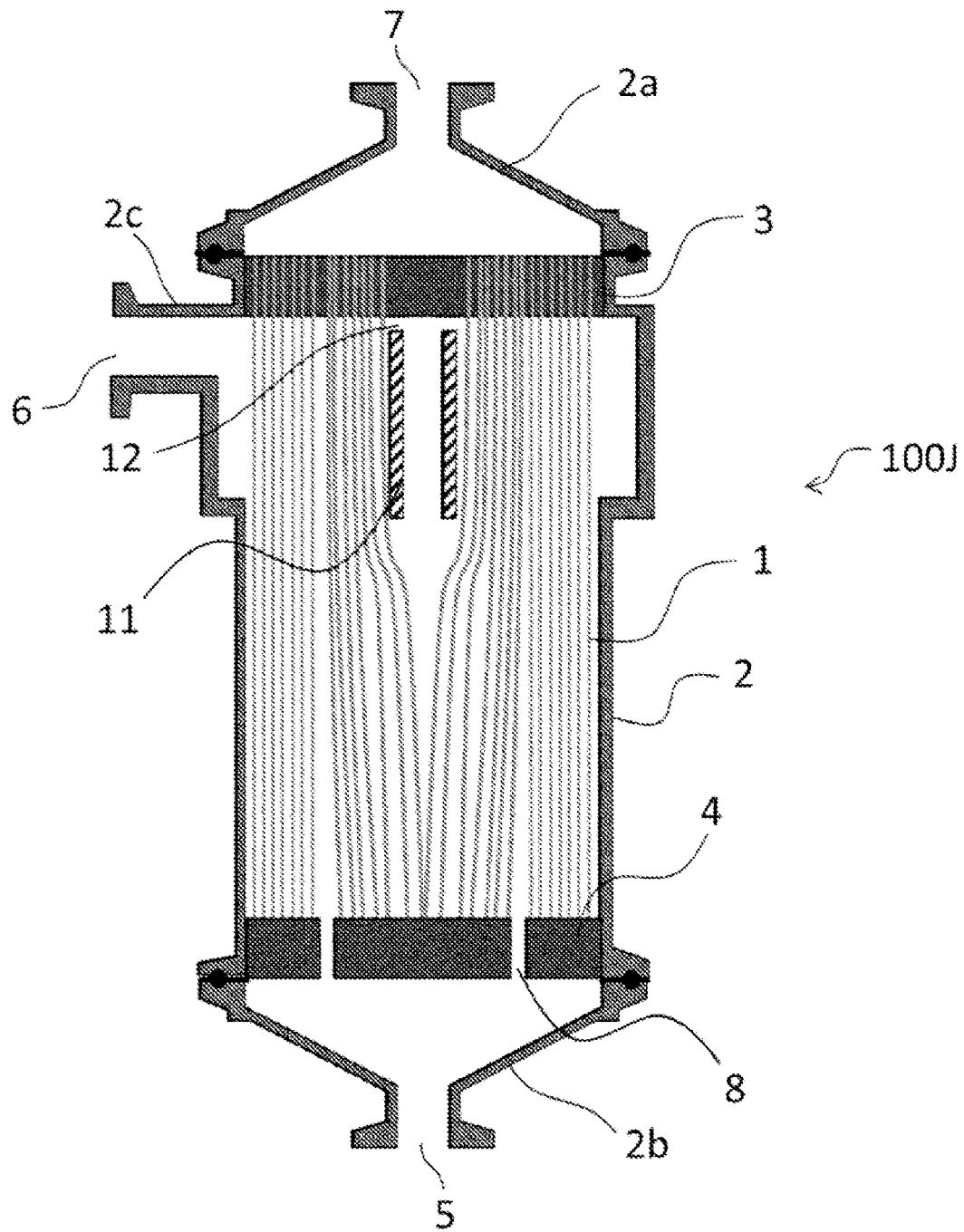
FIG. 20 is a schematic vertical cross-sectional view showing an example of the hollow-fiber membrane module of the present invention.

A hollow-fiber membrane module 100J shown in FIG. 20 was prepared. The flow-regulating cylinder was not provided, the filling ratio A1 of the hollow-fiber membranes inside of the inner pipe 11 was 0%, and the filling ratio A2 of the hollow-fiber membranes outside of the inner pipe was 50%. The hollow-fiber membrane module 100J was prepared in the same manner as in Example 5 except for the above. As a result of evaluating the clarification rate of the hollow-fiber membrane module 100J by the above method, the clarification rate was 78%.

The flow parameter F, the proportion R1 and the proportion R2 were calculated. The results are shown in Table 2.

TABLE 1

| | Structure | Length of inner pipe or central space part | Membrane filling ratio A1 (%) | Membrane filling ratio A2 (%) | Inside diameter of inner pipe or diameter central space part (mm) | F | R1 (%) | R2 (%) | R3 (%) | R4 (%) | Clarification rate (%) |
|---|---|---|---|---|---|---|---|---|---|---|---|
| Example 1 | Inner pipe | 0.5 × D | 0 | 50 | 20 | 3.4 | 100 | 15.3 | 20.6 | 100 | 90 |
| Example 2 | Inner pipe | D | 0 | 50 | 20 | 3.4 | 100 | 15.3 | 20.6 | 100 | 98 |
| Example 3 | Inner pipe | 1.5 × D | 0 | 50 | 20 | 3.4 | 100 | 15.3 | 20.6 | 100 | 99.5 |
| Example 4 | Inner pipe | 2 × D | 0 | 50 | 20 | 3.4 | 100 | 15.3 | 20.6 | 100 | 99.5 |
| Example 5 | Inner pipe | 3 × D | 0 | 50 | 20 | 3.4 | 100 | 15.3 | 20.6 | 100 | 99.5 |
| Example 6 | Inner pipe | 5 × D | 0 | 50 | 20 | 3.4 | 100 | 15.3 | 20.6 | 100 | 99 |
| Example 7 | Inner pipe | 40 × D | 0 | 50 | 20 | 3.4 | 100 | 15.3 | 20.6 | 100 | 96 |
| Example 8 | Inner pipe | 60 × D | 0 | 50 | 20 | 3.4 | 100 | 15.3 | 20.6 | 100 | 94 |
| Example 9 | Inner pipe | 3 × D | 10 | 50 | 20 | 2.7 | 100 | 15.3 | 20.6 | 100 | 98 |
| Example 10 | Inner pipe | 3 × D | 20 | 50 | 20 | 2.0 | 100 | 15.3 | 20.6 | 100 | 98 |
| Example 11 | Inner pipe | 3 × D | 30 | 50 | 20 | 1.3 | 100 | 15.3 | 20.6 | 100 | 96 |
| Example 12 | Inner pipe | 3 × D | 0 | 50 | 12 | 1.2 | 100 | 8.8 | 20.6 | 100 | 96 |
| Example 13 | Inner pipe | 3 × D | 0 | 60 | 28 | 7.9 | 100 | 21.8 | 20.6 | 100 | 99 |
| Example 14 | Inner pipe | 3 × D | 0 | 50 | 20 | 3.4 | 80 | 15.3 | 20.6 | 100 | 98 |
| Example 15 | Inner pipe | 3 × D | 0 | 50 | 20 | 3.4 | 50 | 15.3 | 20.6 | 100 | 97 |
| Example 16 | Inner pipe | 3 × D | 0 | 50 | 20 | 3.4 | 33.3 | 15.3 | 20.6 | 100 | 94 |
| Example 17 | Inner pipe | 3 × D | 0 | 50 | 20 | 3.4 | 100 | 30.6 | 20.6 | 100 | 99 |
| Example 18 | Inner pipe | 3 × D | 0 | 50 | 20 | 3.4 | 100 | 5.1 | 20.6 | 100 | 99 |
| Example 19 | Inner pipe | 3 × D | 0 | 50 | 20 | 3.4 | 100 | 15.3 | 70 | 29.4 | 94 |
| Example 20 | Inner pipe | 3 × D | 0 | 50 | 20 | 3.4 | 100 | 15.3 | 41 | 100 | 97 |
| Example 21 | Inner pipe | 3 × D | 0 | 50 | 20 | 3.4 | 100 | 15.3 | 9.3 | 100 | 98 |
| Example 22 | Inner pipe | 3 × D | 0 | 50 | 20 | 3.4 | 100 | 15.3 | 20.6 | 50 | 98 |
| Example 23 | Inner pipe | 3 × D | 0 | 50 | 20 | 3.4 | 100 | 15.3 | 19.3 | 33.3 | 94 |

TABLE 2

| | Structure | Length of inner pipe or central space part | Membrane filling ratio A1 (%) | Membrane filling ratio A2 (%) | Inside diameter of inner pipe or diameter central space part (mm) | F | R1 (%) | R2 (%) | R3 (%) | R4 (%) | Clarification rate (%) |
|---|---|---|---|---|---|---|---|---|---|---|---|
| Example 24 | Central space part | N (74 × D) cone | 0 | 35 | 20 | 2.4 | — | — | 20.6 | 100 | 94 |
| Example 25 | Central space part | N (74 × D) cone | 0 | 50 | 20 | 3.4 | — | — | 20.6 | 100 | 91 |
| Example 26 | Central space part | N (74 × D) cone | 0 | 50 | 20 | 3.4 | — | — | 20.6 | 80 | 90 |
| Example 27 | Central space part | N (74 × D) cone | 0 | 50 | 20 | 3.4 | — | — | 19.3 | 33.3 | 86 |
| Example 28 | Central space part | N (74 × D) cylinder | 0 | 35 | 20 | 2.4 | — | — | 20.6 | 100 | 94 |
| Example 29 | Central space part | N (74 × D) cylinder | 0 | 50 | 20 | 3.4 | — | — | 20.6 | 100 | 92 |
| Example 30 | Central space part | N (74 × D) cylinder | 0 | 50 | 20 | 3.4 | — | — | 20.6 | 80 | 90 |
| Example 31 | Central space part | N (74 × D) cylinder | 0 | 50 | 20 | 3.4 | — | — | 19.3 | 33.3 | 87 |
| Comparative Example 1 | No inner pipe No central space part Flow-regulating cylinder | — | — | — | — | — | — | — | 19.3 | 33.3 | 78 |
| Comparative Example 2 | Inner pipe No central space part No flow-regulating cylinder | 3 × D | 0 | 50 | 20 | 3.4 | 100 | 15.3 | — | — | 78 |

While the invention has been described in detail and with reference to specific embodiments thereof, it will be apparent to one skilled in the art that various changes and modifications can be made therein without departing from the spirit and scope of the invention. This application is based on Japanese Patent Application (Japanese Patent Application No. 2017-15171) filed on Jan. 31, 2017, the entirety of which is incorporated herein by way of reference.

INDUSTRIAL APPLICABILITY

The hollow-fiber membrane module of the present invention can be used for water purification treatment, industrial water treatment, wastewater treatment, seawater desalination treatment, and treatment of various liquids such as fermented liquids, food, and beverages.

DESCRIPTION OF REFERENCE NUMERALS AND SIGNS

100A Hollow-fiber membrane module
100B Hollow-fiber membrane module
100C Hollow-fiber membrane module
100D Hollow-fiber membrane module
100E Hollow-fiber membrane module
100F Hollow-fiber membrane module
100G Hollow-fiber membrane module
100H Hollow-fiber membrane module
100I Hollow-fiber membrane module
100J Hollow-fiber membrane module
1 Hollow-fiber membrane
2 Case
2a Case upper cap
2b Case lower cap
2c Case side nozzle
3 First potting part
4 Second potting part
5 Raw liquid inflow port
6 Raw liquid outlet
7 Filtered liquid outlet
8 Through hole
9 Flow-regulating cylinder
10 Flow-regulating hole (first flow-regulating hole)
11 Inner pipe
12 Side opening part (first side opening part)
13 Central space part
14 Pin
15 First potting cap
16 Second potting cap
17 Potting agent charging fixture

The invention claimed is:

1. A hollow-fiber membrane module comprising:
a cylindrical case having a first end and a second end in an axial direction;
a plurality of hollow-fiber membranes housed in the case;
a first potting part bonding end parts of the plurality of hollow-fiber membranes located on the first end side of the case while the end parts being open; and
a second potting part bonding end parts of the plurality of hollow-fiber membranes located on the second end side of the case, wherein
the hollow-fiber membrane module further has a flow-regulating structure in which a fluid flowing outside the hollow-fiber membranes from the second end side to the first end side generates a flow directed to a radial center part on the second end side of the first potting part, and further generates a radial flow directed from a radial center part to a radially outer peripheral side on the second end side of the first potting part,
the flow-regulating structure includes an inner pipe and a flow-regulating cylinder which are provided on the second end side of the first potting part,
the inner pipe is provided on a radial center part of the case,
the inner pipe includes one or more side opening parts on a side surface thereof adjacent to the second end side of the first potting part,
when defining an inside diameter of the side nozzle as D, a length of the inner pipe is D or more and 5×D or less,
a filling ratio of the hollow-fiber membranes inside of the inner pipe is smaller than a filling ratio of the hollow-fiber membranes outside of the inner pipe,
the flow-regulating cylinder is provided between the hollow-fiber membranes and the case,
the flow-regulating cylinder has one or more flow-regulating holes on a side surface thereof, and
the case has a side nozzle on a side surface thereof; and wherein
the inner pipe has one or more first side opening parts on the side surface thereof, and
a proportion R1 according to formula (4) of a total opening area occupied by the first side opening parts to a total opening area of the side opening parts is 50% or more:

$$R1[\%] = [\text{total opening area of first side opening parts}]/[\text{total opening area of side opening parts}] \times 100 \quad (4).$$

2. The hollow-fiber membrane module according to claim 1, wherein
defining the filling ratio of the hollow-fiber membranes on inside of the inner pipe as A1,
the filling ratio of the hollow-fiber membranes outside of the inner pipe as A2,
a cross-sectional area of a cross section perpendicular to an axial direction of the inner pipe as T1, and
a cross-sectional area of the cross section perpendicular to the axial direction of the case as T2,
a flow parameter F in the following formula (1) is from 1.0 to 8.0;

$$F = (A2 - A1) \times T1/T2 \quad (1)$$

3. The hollow-fiber membrane module according to claim 1, wherein a proportion R2 according to formula (5) of the total opening area of the first side opening parts of the inner pipe to the cross-sectional area T2 of the cross section perpendicular to the axial direction of the case is from 5% to 50%:

$$R2[\%] = [\text{total opening area of first side opening parts}]/T2 \times 100 \quad (5).$$

4. The hollow-fiber membrane module according to claim 1, wherein a proportion R3 of a total opening area of the flow-regulating holes of the flow-regulating cylinder to the cross-sectional area of the cross section perpendicular to the axial direction of the case is from 5% to 50%.

5. The hollow-fiber membrane module according to claim 1, wherein
the flow-regulating cylinder has one or more first flow-regulating holes on the side surface thereof, and a proportion R4 according to formula (7) of a total opening area occupied by the first flow-regulating holes to the total opening area of the flow-regulating holes is 50% or more;

$$R4[\%] = [\text{total opening area of first flow-regulating holes}]/[\text{total opening area of flow-regulating holes}] \times 100 \quad (7)$$

\* \* \* \* \*